United States Patent
Imaizumi et al.

(10) Patent No.: US 11,588,954 B2
(45) Date of Patent: Feb. 21, 2023

(54) IMAGE PROCESSING DEVICE, CONTROL METHOD, AND NON-TRANSITORY RECORDING MEDIUM

(71) Applicant: SHARP KABUSHIKI KAISHA, Sakai (JP)

(72) Inventors: Daisaku Imaizumi, Sakai (JP); Teruhiko Matsuoka, Sakai (JP); Akihito Yoshida, Sakai (JP); Chiharu Hirayama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/535,358

(22) Filed: Nov. 24, 2021

(65) Prior Publication Data
US 2022/0174182 A1 Jun. 2, 2022

(30) Foreign Application Priority Data

Dec. 2, 2020 (JP) .............................. JP2020-200583

(51) Int. Cl.
*H04N 1/407* (2006.01)
*H04N 1/00* (2006.01)

(52) U.S. Cl.
CPC ....... *H04N 1/4072* (2013.01); *H04N 1/00803* (2013.01); *H04N 1/00811* (2013.01)

(58) Field of Classification Search
CPC ............. H04N 1/4072; H04N 1/00803; H04N 1/00811; H04N 1/40012; H04N 1/6072; H04N 1/40062; H04N 1/403
See application file for complete search history.

(56) References Cited

U.S. PATENT DOCUMENTS

| 5,872,864 | A | * | 2/1999 | Imade | G06V 30/413 |
| | | | | | 382/176 |
| 9,204,011 | B1 | * | 12/2015 | Zheng | H04N 1/407 |
| 9,998,631 | B2 | * | 6/2018 | Otake | H04N 1/4072 |
| 2008/0013831 | A1 | * | 1/2008 | Aoki | G06V 30/414 |
| | | | | | 382/176 |
| 2009/0103143 | A1 | * | 4/2009 | Baba | H04N 1/40062 |
| | | | | | 358/448 |
| 2010/0073743 | A1 | * | 3/2010 | Koyatsu | H04N 1/6016 |
| | | | | | 358/518 |
| 2013/0021626 | A1 | * | 1/2013 | Kim | H04N 1/622 |
| | | | | | 358/1.9 |
| 2014/0036320 | A1 | * | 2/2014 | Tanaka | H04N 1/0044 |
| | | | | | 358/465 |

(Continued)

FOREIGN PATENT DOCUMENTS

JP 2007266921 A * 10/2007
JP 2009-100285 A 5/2009

(Continued)

*Primary Examiner* — Ted W Barnes
(74) *Attorney, Agent, or Firm* — ScienBiziP, P.C.

(57) ABSTRACT

An image processing device includes an image reader that reads an image, a first determiner that determines whether character crushing occurs when the image is binarized, a second determiner that determines a rate of a photographic region in the image, and a controller that performs conversion into monochrome N-gradation image data based on determination results of the first and second determiners.

11 Claims, 21 Drawing Sheets

(56) References Cited

U.S. PATENT DOCUMENTS

| | | | | |
|---|---|---|---|---|
| 2014/0185104 A1* | 7/2014 | Hasegawa | ................ | H04N 1/38 |
| | | | | 358/452 |
| 2014/0368885 A1* | 12/2014 | Ido | ...................... | G06K 15/188 |
| | | | | 358/3.1 |
| 2018/0005340 A1* | 1/2018 | Otake | ................ | H04N 5/23229 |
| 2020/0336604 A1* | 10/2020 | Takashima | ......... | H04N 1/00408 |
| 2021/0211556 A1* | 7/2021 | Hirayama | .......... | H04N 1/40062 |
| 2021/0350523 A1* | 11/2021 | Inagaki | .................... | G07D 7/20 |
| 2022/0174182 A1* | 6/2022 | Imaizumi | ........... | H04N 1/00803 |
| 2022/0284631 A1* | 9/2022 | Matsuoka | ................. | G06T 7/90 |

FOREIGN PATENT DOCUMENTS

| | | | | | |
|---|---|---|---|---|---|
| JP | 2011-142409 A | | 7/2011 | | |
| JP | 2011142409 A | * | 7/2011 | | |
| JP | 2020010163 A | * | 1/2020 | ......... | H04N 1/00005 |

* cited by examiner

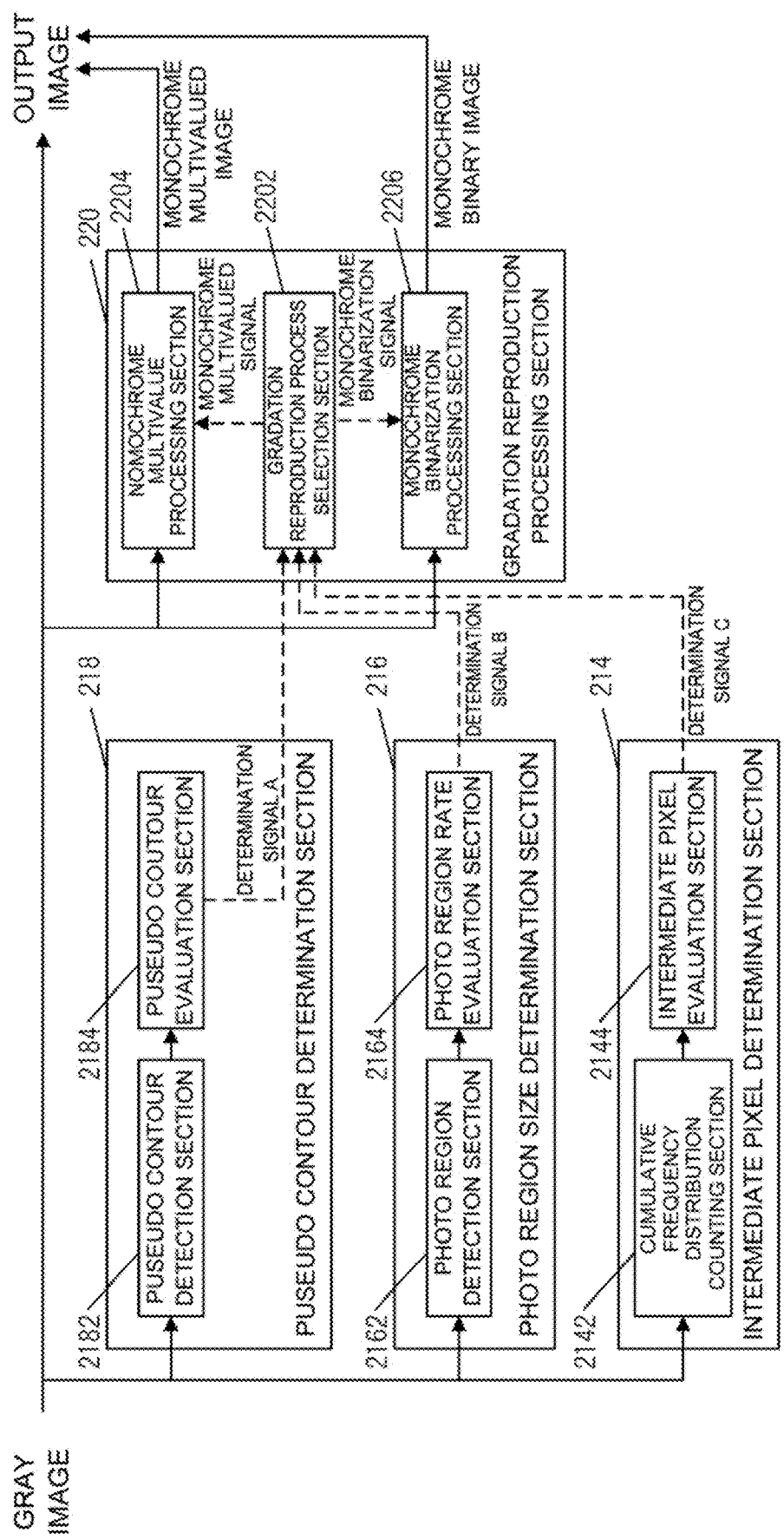

FIG. 20A

| Lv. | 1 | 2 | 3 | 4 | 5 |
|---|---|---|---|---|---|
| Param. | set. A | set. B | set. C | set. D | set. E |

SIZE PRIORITY ← → IMAGE QUALITY PRIORITY

FIG. 20B

| Param. | set. A | set. B | set. C | set. D | set. E |
|---|---|---|---|---|---|
| PHOTO REGION SIZE THRESHOLD (THps) | THps1 | THps2 | THps3 | THps4 | THps5 |

FIG. 20C

| Param. | set. A | set. B | set. C | set. D | set. E |
|---|---|---|---|---|---|
| BINARIZATION PROCESSING METHOD | MONOCHROME MULTIVALUE | MONOCHROME MULTIVALUE | MONOCHROME MULTIVALUE | ERROR DIFFUSION | ERROR DIFFUSION |

IMAGE PROCESSING DEVICE, CONTROL METHOD, AND NON-TRANSITORY RECORDING MEDIUM

BACKGROUND OF THE INVENTION

Field of the Invention

The present disclosure relates to an image processing device and the like. The present application claims the benefit of priority to Japanese Patent Application No. 2020-200583 filed in Japan on Dec. 2, 2020, and by referring to this patent application, the entire contents thereof are included in the present application.

Description of the Background Art

In recent years, with the widespread use of digital multifunction peripherals (MFPs) and the Internet, it has become common practice to convert images on paper into image data in an electronic data format by reading the images on paper with a scanner, and to transmit the image data in the electronic data format as an attachment by e-mail or the like.

Furthermore, techniques for performing appropriate processing on read image data have also been proposed. For example, a technique has been proposed in which an input image is separated into four image regions, namely, a character region, a halftone region, a line region, and an image region, according to a type of the image, auto color selection (ACS) processing is performed on each of the separated image regions, and an ACS result of the entire input image (document) is determined based on results of the ACS processing performed on the individual image regions (see, for example, Japanese Unexamined Patent Application Publication No. 2011-142409).

For image data generated by reading an image from a document, a technique has been proposed for compressing the data into a compression format for binary images when the document is a text document, and compressing the data into a compression format for multivalued images when the document is not a text document (see, for example, Japanese Unexamined Patent Application Publication No. 2009-100285).

However, Japanese Unexamined Patent Application Publication Nos. 2011-142409 and 2009-100285 only discloses a determination of a method for processing image data using only a single determination result, such as a determination as to whether a document is a text document. Therefore, for example, an output of image data subjected to appropriate processing according to a result of a determination as to whether character crushing occurs and a result of a determination based on characteristics of the entire image data is not taken into consideration.

In view of the above-described problem, the present disclosure is to provide an image processing device capable of outputting an input image in an appropriate number of gradations.

SUMMARY OF THE INVENTION

According to a first embodiment of the present disclosure, an image processing device includes an image reader that reads an image, a first determiner that determines whether character crushing occurs when the image is binarized, a second determiner that determines a rate of a photographic region in the image, and a controller that performs conversion into monochrome N-gradation image data based on determination results of the first and second determiners.

According to another aspect of the present disclosure, a control method includes reading an image, determining whether character crushing occurs when the image is binarized, determining a rate of a photographic region in the image, and performing conversion into monochrome N-gradation image data based on determination results of the first and second determiners.

According to a further aspect of the present disclosure, a non-transitory computer readable recording medium recording a program that causes a computer to execute reading an image, determining whether character crushing occurs when the image is binarized, determining a rate of a photographic region in the image, and performing conversion into monochrome N-gradation image data based on determination results of the first and second determiners.

According to the present disclosure, an input image may be output with an appropriate number of gradations.

BRIEF DESCRIPTION OF THE DRAWINGS

FIG. 2 is a diagram schematically illustrating a process according to the first embodiment.

FIGS. 20A to 20C are diagrams illustrating an example of an operation according to the seventh embodiment.

DESCRIPTION OF THE PREFERRED EMBODIMENTS

Embodiments for implementing the present disclosure will be described hereinafter with reference to the accompanying drawings. The following embodiments are examples for explaining the present disclosure, and a technical scope of the disclosure described in claims is not limited to the following description.

1. First Embodiment

1.1 Functional Configuration

Figure 1:
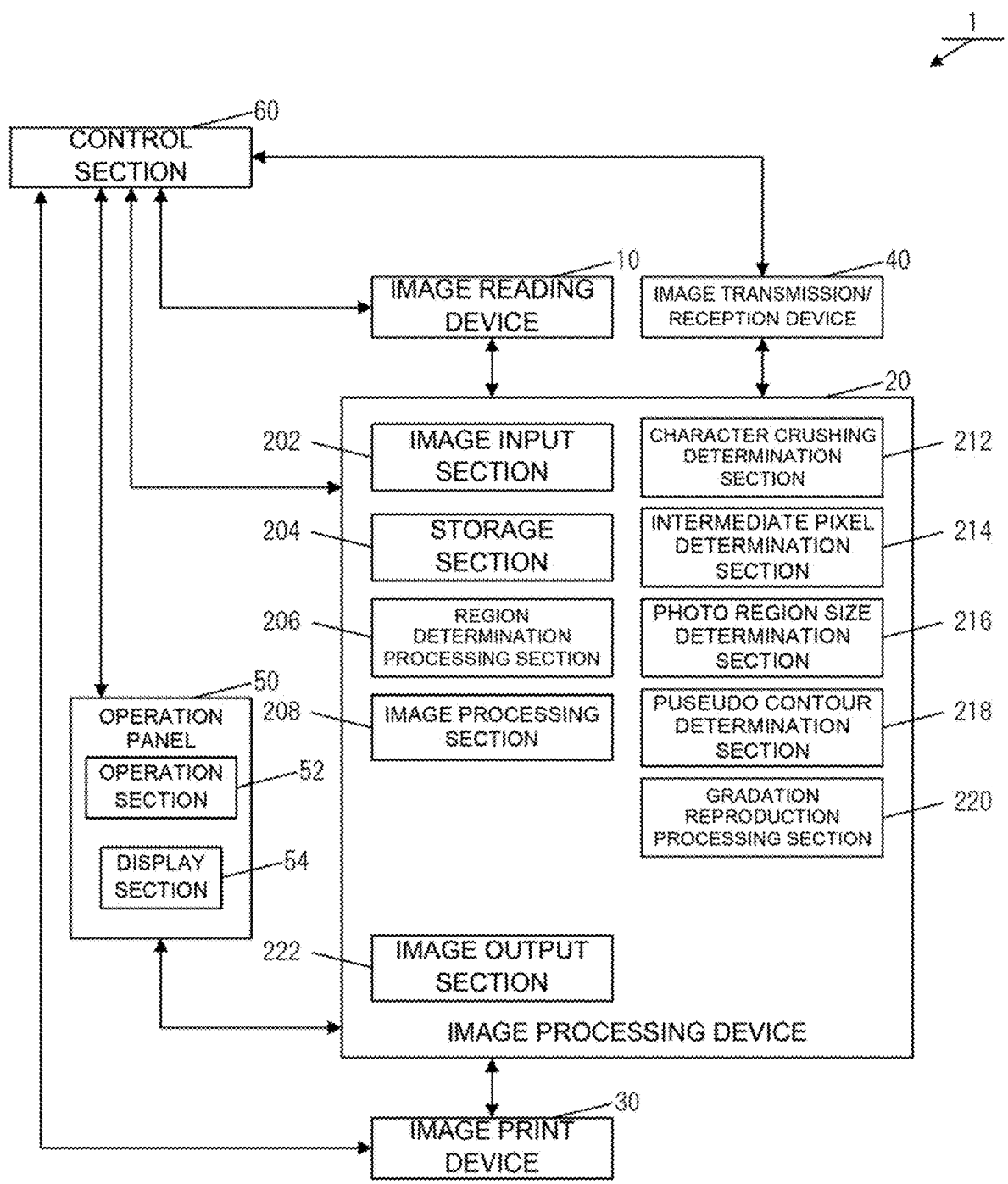
FIG. 1 is a diagram illustrating a functional configuration of an image forming apparatus according to a first embodiment.

FIG. 1 is a block diagram illustrating a functional configuration of an image forming apparatus 1 according to a first embodiment. The image forming apparatus 1 is a digital multifunction peripheral having a copy function, a print function, a scanner function, and the like. The image forming apparatus 1 includes an image reading device 10, an image processing device 20, an image printing device 30, an image transmission/reception device 40, an operation panel 50, and a control section 60.

The image reading device 10 optically reads an image in a document. The image reading device 10 includes, for example, a color scanner having a charge coupled device (CCD). The image reading device 10 reads a reflected light image from a document as an analog signal of RGB (R: red, G: green, B: blue) using a CCD, and inputs the analog signal to the image processing device 20.

The image processing device 20 receives the analog signals read by the image reading device 10, generates image data based on the input analog signals, executes various processes on the generated image data, and outputs the data.

In this embodiment, the image processing device 20 performs an auto color selection (ACS: Auto Color Selection) determination to determine presence or absence of color in image data based on analog signals input from the image reading device 10. Furthermore, when determining that the image data corresponds to a monochrome image constituted only by achromatic color in the ACS determination, the image processing device 20 converts the image data into image data of a grayscale image. Further, the image processing device 20 converts the image data of the grayscale image into image data representing an image of a predetermined number of gradations to be output.

Here, the image data of a grayscale image means image data in which no information other than luminous intensity (brightness) is included in a sample value (pixel value) of each pixel of the image data. It is assumed that the pixel value takes any integer value from 0 to a largest value that can be employed as a pixel value (hereinafter referred to as a maximum pixel value). The maximum pixel value is determined based on a level of quantization of a pixel value for each pixel (a size of data representing a pixel value). For example, when a pixel value is represented by an information amount of 8 bits, the maximum pixel value is 255. In this case, a pixel with a pixel value of 0 is a black pixel with the lowest luminance (a pixel with no light), and a pixel with a pixel value of 255 is a white pixel with the highest luminance (a pixel with maximum light output).

In this embodiment, the number of types of pixel values used in the image data output by the image processing device 20 is referred to as the number of gradations. In this embodiment, images are classified as follows based on the number of gradations.

(1) Monochrome Binary Image (Monochrome 2 Gradations)

A monochrome binary image indicates an image in which the number of gradations is 2 and a pixel value is either 0 or the maximum pixel value. Note that, in this embodiment, conversion of image data to image data corresponding to a monochrome binary image (monochrome 2 gradations) is referred to as a monochrome binarization process. In the monochrome binarization process, a predetermined pixel value (luminance) is fixed as a threshold value, and for each pixel, when a pixel value of interest is less than the threshold value, the pixel of interest is changed into a black pixel, and when the pixel value of interest is not less than the threshold value, the pixel is changed into a white pixel.

(2) Grayscale Image

A grayscale image is an image that has a number of gradations larger than 2 and a maximum pixel value of +1. For example, when the maximum pixel value is 255, the pixel value is any integer from 0 to 255, and therefore, the number of gradations is 256.

(3) Monochrome Multivalued Image

A monochrome multivalued image is an image that has a number of gradations larger than 2 and not larger than the maximum pixel value. For example, when the maximum pixel value is 255, the monochrome multivalued image is an image with 4, 8, and 16 gradations and so on. In other words, a monochrome multivalued image is an image with a limited level of quantization. Note that, in this embodiment, conversion of image data to image data corresponding to a monochrome multivalued image is referred to as a monochrome multivalue process. In the monochrome multivalue process, for example, when the number of gradation is 4, pixels in image data are any of the following four types: a black pixel (pixel value of 0), a dark gray pixel (pixel value of 96), a light gray pixel (pixel value of 160), and a white pixel (pixel value of 255).

As described above, the number of gradations in a monochrome binary image is 2 in this embodiment. In this embodiment, the number of gradations in a grayscale image is the kth power of 2, where k is the number of quantization bits in representing a pixel value of a pixel. For example, when the number of quantization bits in representing a pixel value of each pixel in a grayscale image is 8 bits, the number of gradations in the grayscale image is 256 (8 powers of 2). The number of gradations in a monochrome multivalued image is a value between the number of gradations in a monochrome binary image and the number of gradations in a grayscale image. That is, when the number of gradations in a grayscale image is N, the number of gradations in a monochrome multivalued image is M (here, 2<M<N). For example, when a pixel value of each pixel in a grayscale image is represented by an information amount of 8 bits, a pixel value of each pixel in a monochrome multivalued image is the number of gradations that can be represented by a range from 2 bits to 7 bits. For example, when a pixel value of each pixel is represented by an information amount of 2 bits, the number of gradations in the monochrome multivalued image is 4. When a pixel value of each pixel is represented by an information amount of 3 bits, the number of gradations in the monochrome multivalued image is 8. When a pixel value of each pixel is represented by an information amount of 7 bits, the number of gradations in the monochrome multivalued image is 128.

The image processing device 20 includes an image input section 202, a storage section 204, a region determination processing section 206, an image processing section 208, a character crushing determination section 212, an intermediate pixel determination section 214, a photographic region size determination section 216, a pseudo contour determination section 218, a gradation reproduction processing section 220, and an image output section 222.

The image input section 202 receives an RGB analog signal supplied from the image reading device 10, and performs a process of converting the RGB analog signal into an RGB digital signal (that is, an RGB signal). As a result, the image input section 202 generates image data including the RGB signal.

In addition, the image input section 202 performs an ACS determination on the image data. When the image data corresponds to a monochrome image as a result of the ACS determination, the image input section 202 converts the image data into image data of a grayscale image (gray image).

The storage section 204 is a functional section that stores various data, such as image data, and various programs, and is constituted by a storage device, such as a solid state drive (SSD) or a hard disk drive (HDD) that is a semiconductor memory.

The region determination processing section 206 determines, in an image based on the image data, regions including components of a document, such as a character, a diagram and a photograph, and a table, and separates the individual components into regions. For example, when detecting a region including a photograph (photographic region), the region determination processing section 206 determines for each pixel in the image data whether the pixel constitutes a photograph, and determines a region including pixels constituting a photograph as a photographic region.

The following method may be used to determine whether a pixel constitutes a photographic region.

(1) The region determination processing section 206 calculates differences between a pixel value of a pixel of interest and pixel values of peripheral pixels of the pixel of interest, aggregates magnitudes of the differences, and determines a feature of each pixel (a feature of the differences in a pixel value with the peripheral pixels) while changing the pixel of interest. At this time, the region determination processing section 206 determines whether the pixel is included in a photographic region based on the continuity of features of pixels (e.g., features such as an average value of the differences of the pixel values being within a predetermined threshold value) and the like, and determines the region including the pixel constituting the photographic region as the photographic region.

(2) The region determination processing section 206 divides an image based on the image data into pixel blocks within a predetermined range (e.g., pixels in 8 rows×8 columns). Next, the region determination processing section 206 calculates, in each pixel block, an average value of pixel values of pixels within a range of the pixel block. Next, the region determination processing section 206 calculates differences between the calculated average value and the pixel values of the pixels within the range of the pixel block and aggregates the differences. The region determination processing section 206 determines, for each pixel block, whether the pixel block indicates a feature of a photograph, using the aggregated value as an evaluation value (feature value). The region determination processing section 206 determines a region constituted by pixel blocks that indicate a photographic feature as a photographic region.

Other regions (text regions, figure regions, table regions, and the like) may be detected by using a method for comparing a pixel of interest with surrounding pixels or a method based on a feature of each pixel block, as in the method for detecting a photographic region described above.

As an alternative method, the region determination processing section 206 may use a method for determining whether each pixel of the image data is included in a character region, a halftone region, a base region, or a photographic region (photographic paper region), and separating the image data for each feature of the included pixel based on the determination.

An algorithm for separating each pixel may be based on an existing region separation method. For example, the method described in Japanese Unexamined Patent Application Publication No. 2002-232708, as illustrated below, may be used.

(1) The minimum and maximum density values are calculated in a block of n×m pixels (e.g., 7×15 pixels) including a pixel of interest. The density value may be a MIN (R1, G1, B1) value for a density value signal (R1, G1, B1) in individual RGB color signals (R: red, G: green, B: blue) in image data, or may be luminance calculated based on the density value signal.

(2) The maximum density difference is calculated using the calculated minimum and maximum density values.

(3) A sum of absolute values of density differences of pixels adjacent to the pixel of interest, i.e., a total density complexity (a sum of values calculated in a main scanning direction and a sub-scanning direction) is calculated.

(4) The calculated maximum density difference is compared with the maximum density difference threshold value, and the calculated total density complexity is compared with a total density complexity threshold value.

(5) When the maximum density difference is smaller than the maximum density difference threshold value and the total density complexity is smaller than the total density complexity threshold value, the pixel of interest is determined to belong to a base/photographic paper region.

(6) When the above conditions are not satisfied, the pixel of interest is determined to belong to a character/halftone region.

(7) For a pixel that is determined to belong to the base/photographic paper region, when the pixel of interest satisfies the condition in which the maximum density difference is smaller than the base/photographic paper determination threshold value, it is determined that the pixel of interest is a base candidate pixel, and otherwise, it is determined that the pixel of interest is a photographic paper pixel.

(8) For a pixel that is determined to belong to the character/halftone region, when the pixel of interest satisfies the condition in which the total density complexity is smaller than a value obtained by multiplying the maximum density difference by the halftone determination threshold value, it is determined that the pixel of interest is a character pixel, and otherwise, it is determined that the pixel of interest is a halftone pixel.

In this manner, the region determination processing section 206 separates the image data into a plurality of types of regions. In this case, the region determination processing section 206, when determining one region, may increase detection accuracy of the one region by exclusively using results of determinations performed on other regions.

The image processing section 208 executes general image processing on image data. The image processing section 208 executes a filtering process, a sharpening process, a gradation conversion process, and the like for performing edge detection on image data.

The character crushing determination section 212 determines whether character crushing occurs when image data is converted to a monochrome binary image. The character crushing refers to the fact that when the number of gradations used in image data is reduced (for example, when a grayscale image is converted to a monochrome binary image), pixels of a character and pixels of a base become the same color, and therefore, it is difficult for the user to recognize the character.

The character crushing determination section 212 determines whether character crushing occurs, for example, by the following process. First, the character crushing determination section 212 detects edges in image data of a grayscale image. For example, the character crushing determination section 212 detects edges by generating an edge image by applying an edge detection operator to the grayscale image. Examples of the edge detection operator include horizontal direction (x) and vertical direction (y) operators referred to as Prewitt or Sobel. Similarly, the character crushing determination section 212 detects edges in an image (a monochrome binary image) obtained by performing a monochrome binarization process on a grayscale image.

Subsequently, the character crushing determination section 212 obtains, for each pixel, a difference value of pixel values at the same position with reference to an edge image generated from a grayscale image and an edge image generated from a monochrome binary image. Furthermore, the character crushing determination section 212 divides the image data into blocks of a predetermined size. Then, the character crushing determination section 212 calculates, for each block, a statistical value of a histogram based on a difference value of pixel values for each pixel included in the block.

A block is one region obtained when an entire gray image is divided into regions each of which includes a plurality of pixels, for example, a rectangular region of a predetermined size. The block may be a circular or rhombic region, and one pixel may belong to a plurality of pixel blocks. Furthermore, the statistical value represents a magnitude of variation of the histogram (difference value of pixel values), for example, an entropy value, a variance value, a standard deviation value, and a mean value of the histogram.

Thereafter, the character crushing determination section 212 extracts blocks having statistical values that satisfy a predetermined condition and which includes a character. For example, the character crushing determination section 212 extracts blocks that include a region determined as a character region by the region determination processing section 206 and that have entropy value larger than a predetermined value. Then, the character crushing determination section 212 determines a group of blocks that are extracted and are contiguous with each other as a region in which character crushing occurs.

Furthermore, the character crushing determination section 212 determines that character crushing occurs when image data is converted to a monochrome binary image, in a case where a size or a number of regions in which character crushing occurs is equal to or larger than a predetermined threshold value.

In addition to the method described above, other general methods may be used to determine whether character crushing occurs. For example, the method based on Japanese Unexamined Patent Application Publication No. 2020-010163 may be used.

The intermediate pixel determination section 214 determines whether at least a predetermined number of intermediate pixels are included in image data. An intermediate pixel has a pixel value included in a predetermined range from 0 to the maximum pixel value. As shown in FIG. 2, the intermediate pixel determination section 214 includes a cumulative frequency distribution counting section 2142 and an intermediate pixel evaluation section 2144.

The cumulative frequency distribution counting section 2142 calculates, from image data of a grayscale image, a cumulative histogram (cumulative frequency value) of pixels having pixel values included between a predetermined first pixel value and a predetermined second pixel value.

The intermediate pixel evaluation section 2144 determines, in the cumulative histogram, whether the number of pixels (the number of pixels for determination) used to determine whether a large number of predetermined intermediate pixels are included is included in any cumulative frequency value between the predetermined first pixel value and the predetermined second pixel value. The intermediate pixel evaluation section 2144 determines that the image data includes a large number of intermediate pixels when the number of pixels for determination is included in any cumulative frequency value between the first pixel value and the second pixel value. That is, when the number of intermediate pixels included in the image data is equal to or larger than the number of pixels for determination, the intermediate pixel evaluation section 2144 determines that the image data includes a large number of intermediate pixels. Here, by using the first and second pixel values as the pixel values with low luminance, a determination as to whether a large number of pixels with low luminance (dark gray pixels) are included may be made.

In general, when a large number of dark gray pixels are included, the image data includes a photographic image, and it is likely that the photographic image is blacked out when the monochrome binarization process is performed on the image data. The black-out means a state in which a region of continuous black pixels is generated by the monochrome binarization process due to the continuous spread of pixels having pixel values equal to or smaller than a pixel value serving as a threshold value for the monochrome binarization process. The user may not identify an image represented by the image data before the monochrome binarization process is performed due to the generation of the black-out.

The number of pixels for determination is determined, for example, based on the number of pixels in a predetermined rate to the total number of pixels. The predetermined rate is a value, such as 10%, 25%, or 50%. The number of pixels for determination may be a fixed value (e.g., 2 million pixels). The predetermined rate and the fixed value may be determined in advance or may be settable by the user.

Figure 3A:
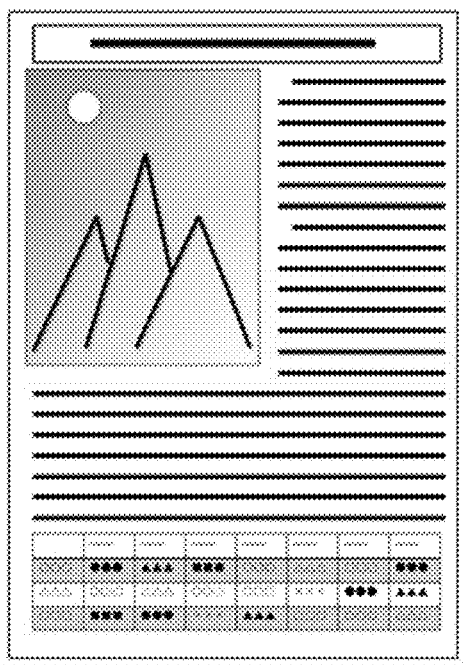
FIGS. 3A and 3B are diagrams illustrating an example of an operation according to the first embodiment.
Figure 3B:
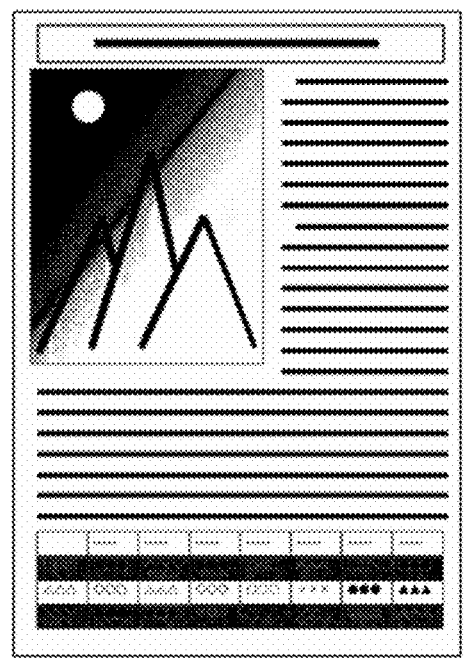
Figure 4:
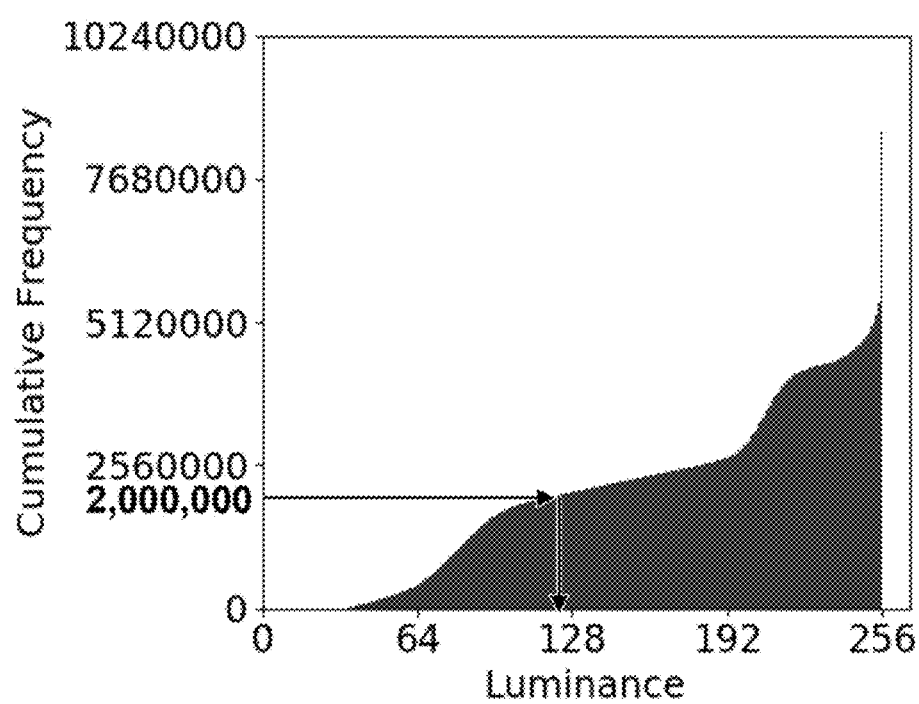
FIG. 4 is a diagram illustrating an example of an operation according to the first embodiment.

A specific example will be described with reference to FIGS. 3A, 3B, and 4. FIGS. 3A and 3B are diagrams illustrating a grayscale image of input image data (FIG. 3A) and an image obtained after a monochrome binarization process is performed on the grayscale image (FIG. 3B). FIG. 4 is a cumulative histogram of pixel values in the image data of the grayscale image shown in FIG. 3A.

It is assumed here that the image data indicates a grayscale image representing an A4 size document at a resolution of 300 dpi. In this case, the number of pixels included in the image data is approximately 8.3 million. Furthermore, it is assumed that the maximum pixel value of the image data is 255, the first pixel value is 35, and the second pixel value is 120. In this case, the intermediate pixel is a dark gray pixel.

Furthermore, it is assumed that the number of pixels for determination is 2 million (approximately 25% of the total number of pixels).

In this case, the cumulative frequency distribution counting section 2142 performs the following processing with reference to the pixel values of the pixels included in the image data.

(1) When a pixel value is less than the first pixel value or larger than the second pixel value, the pixel value is ignored.

When a pixel value of a referenced pixel is less than 35, which is the first pixel value, or larger than 120, which is the second pixel value, the cumulative frequency distribution counting section 2142 ignores the pixel value of the referenced pixel.

(2) When the pixel value is included in the first pixel value to the second pixel value, counting is performed for each pixel value.

When the pixel value of the referenced pixel is equal to or larger than 35, which is the first pixel value, and equal to or smaller than 120, which is the second pixel value, the cumulative frequency distribution counting section 2142 adds 1 to a bin of the pixel value. This means that, for each pixel value, the number of pixels that have the pixel value is counted.

(3) Cumulative histogram is generated.

The cumulative frequency distribution counting section 2142 generates a cumulative histogram for each pixel value, starting with the smallest pixel value, based on the number counted in accordance with (2).

Through such processing, the cumulative frequency distribution counting section 2142 generates a cumulative histogram as shown in FIG. 4. In FIG. 4, the number of pixels for determination, that is 2 million, is in the bin where the number of pixels is 120, which is between the first pixel value of 35 and the second pixel value of 120. Accordingly, the intermediate pixel determination section 214 determines that the grayscale image includes a large number of intermediate pixels. In general, when monochrome binarization is performed on a grayscale image that includes a large number of dark gray pixels, black-out is highly likely to occur.

The photographic region size determination section 216 determines whether the grayscale image has a photographic region equal to or larger than a predetermined region. As shown in FIG. 2, the photographic region size determination section 216 includes a photographic region detection section 2162 and a photographic region rate evaluation section 2164.

The photographic region detection section 2162 performs a photographic region detection process to detect a photographic region in the image data. Note that the photographic region detection section 2162 is different from the region determination processing section 206 and determines only a photographic region. Here, the photographic region detection section 2162 detects a photographic region in accordance with, for example, the following process.

First, the photographic region detection section 2162 detects pixels constituting characters in the image data and masks the pixels. This excludes the character region in the image data from a target of the processing.

Subsequently, the photographic region detection section 2162 detects one or more halftone regions and applies a smoothing process to the regions. Thereafter, the photographic region detection section 2162 generates, for each halftone region, a histogram (masked histogram) of pixel values of pixels included in the halftone region. Then, the photographic region detection section 2162 determines a region having an entropy value of the histogram that is equal to or larger than a predetermined value as a region (area) that includes photographic pixels. In this way, the photographic region detection section 2162 detects a region constituted by the photographic pixels as a photographic region.

The photographic region rate evaluation section 2164 calculates a percentage (rate) of the photographic region in the image data by calculating a value obtained by dividing the number of pixels included in the photographic region detected by the photographic region detection section 2162 by the total number of pixels in the image data as the photographic region rate. The photographic region rate evaluation section 2164 determines whether the photographic region rate is equal to or larger than a predetermined rate.

Figure 5A:
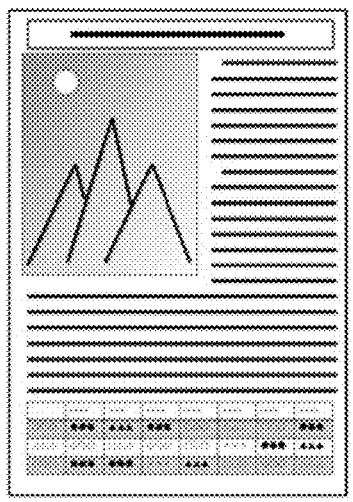
FIGS. 5A to 5F are diagrams illustrating an example of an operation according to the first embodiment.
Figure 5B:
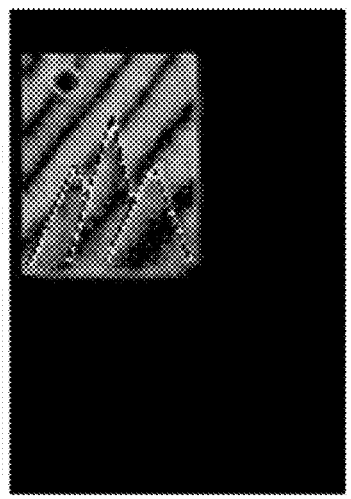
Figure 5C:
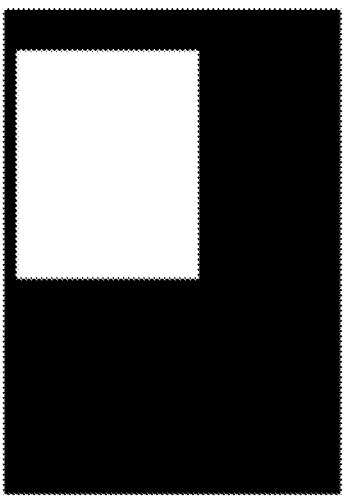
Figure 5D:
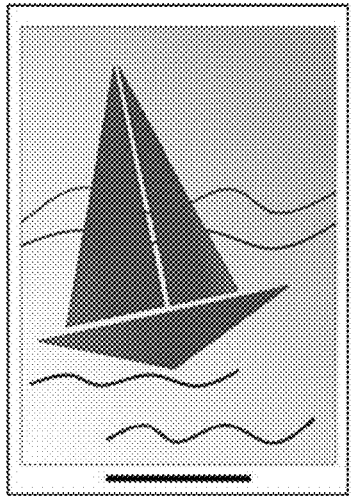
Figure 5E:
Figure 5F:
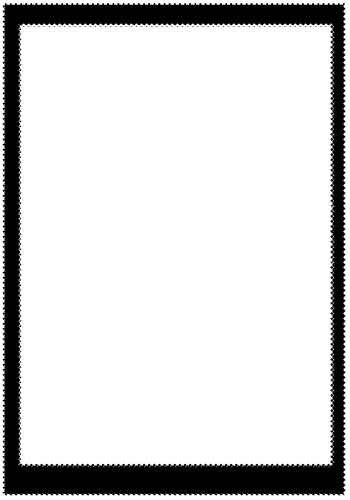

A specific example will be described with reference to FIGS. 5A to 5F. FIGS. 5A and 5D are diagrams illustrating input image data. FIGS. 5B and 5E are diagrams illustrating entropy based on histograms focused on halftone regions (histogram entropy) for FIGS. 5A and 5D. In FIGS. 5B and 5E, as portions become darker, entropy is lower, and as portions become whiter, entropy is higher. FIGS. 5C and 5F are diagrams illustrating results of detection of a photographic region based on the histogram entropy shown in FIGS. 5B and 5E. A white portion indicates a region detected as a photographic region.

A photographic region rate of the photographic region shown in FIG. 5C is approximately 39%. A photographic region rate of the photographic region shown in FIG. 5F is approximately 56%. When the predetermined rate is 50%, the photographic region rate evaluation section 2164 evaluates that the photographic region included in the image data shown in FIG. 5A is small and that the photographic region included in the image data shown in FIG. 5D is large.

Instead of calculation of the photographic region rate based on the photographic region detected by the photographic region detection section 2162, the photographic region rate evaluation section 2164 may calculate the photographic region rate based on the photographic region determined by the region determination processing section 206. In this case, the photographic region size determination section 216 no longer needs to be provided with the photographic region detection section 2162, and a circuit scale of the image forming apparatus 1 may be reduced.

On the other hand, in the process performed by the photographic region rate evaluation section 2164, when the information on the photographic region determined by the region determination processing section 206 is not available due to hardware or software limitations or the like, the photographic region detection section 2162 is required to perform the photographic region determination again. In this case, the photographic region detection section 2162 may detect a photographic region by the method described above, or by executing a process similar to the processing executed by the region determination processing section 206, or by using, for example, a method based on Japanese Unexamined Patent Application Publication No. 2007-234007.

When the photographic region detection section 2162 executes a process similar to the processing executed by the region determination processing section 206, photographic regions detected in the individual functional sections may be the same or different. Specifically, when a method for obtaining features and a processing procedure for detecting features of a photograph in the image data are the same in the photographic region detection section 2162 and the region determination processing section 206, the same determination results are obtained. On the other hand, when the method for obtaining features and the processing procedure are different, different determination results are obtained. For a simple configuration, the method for obtaining features and the processing procedure are common to the photographic region detection section 2162 and the region determination processing section 206.

As described above, there are various possible methods of determining or acquiring a photographic region, and a designer of the image forming apparatus 1 or the like may select the most suitable method as appropriate, taking into account required accuracy of detection of a photographic region, a circuit scale, an amount of processing, processing capability, an amount of memory usage, and the like.

The pseudo contour determination section 218 determines whether a pseudo contour is generated when the monochrome multivalue process is performed on a grayscale image. The pseudo contour is a contour-like line (edge) that is produced when a moderate gradation change portion is converted to monochrome multivalued portion. Pseudo contours are not generated in images with sufficient quantization, such as grayscale images, but may be generated in images with a limited level of quantization, such as monochrome multivalued images.

Figure 6A:
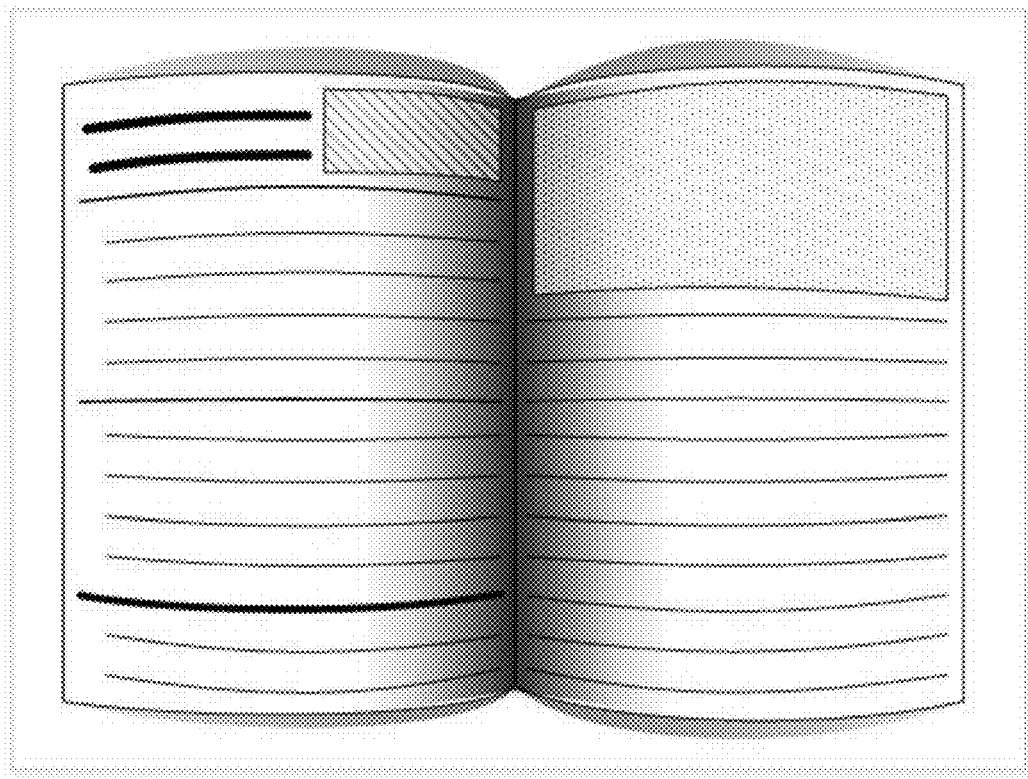
FIGS. 6A and 6B are diagrams illustrating an example of an operation according to the first embodiment.
Figure 6B:
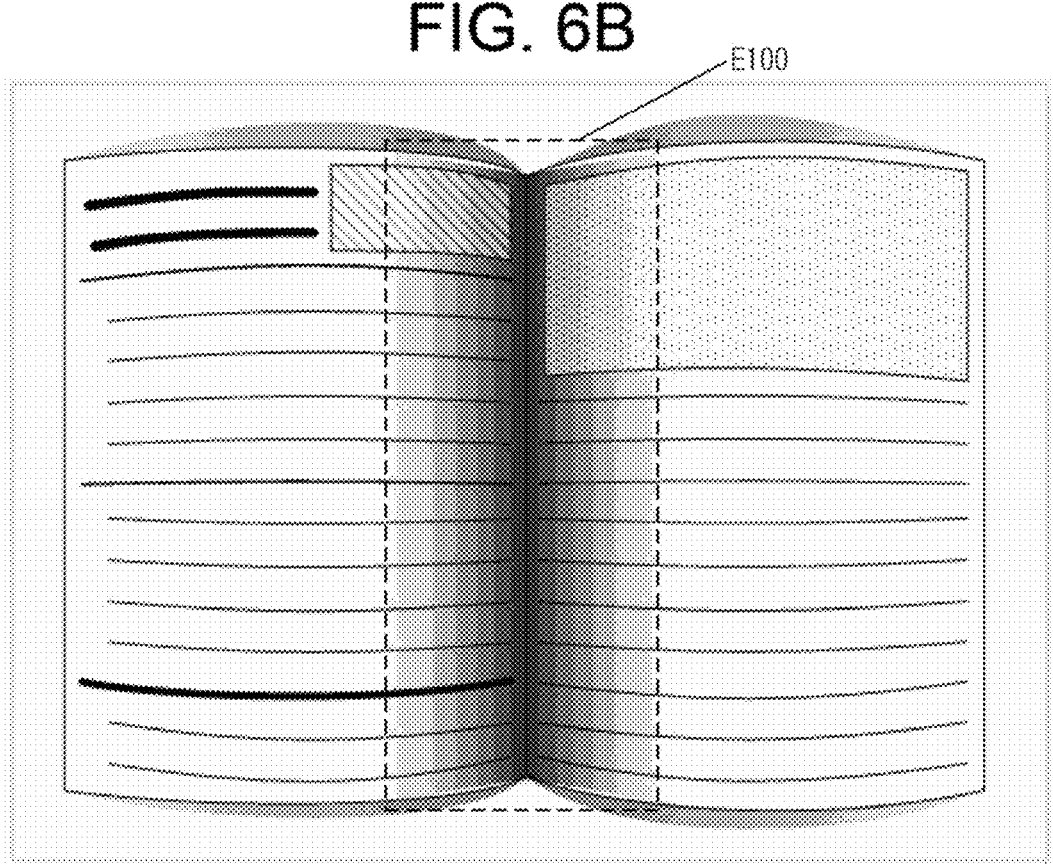

A specific example will be described with reference to FIGS. 6A and 6B. FIG. 6A is a diagram illustrating input image data. In particular, image data of a grayscale image obtained when a book is scanned with the book open (during book scanning) is illustrated in FIG. 6A. FIG. 6B is a diagram illustrating image data obtained when a monochrome multivalue process is executed on the image shown in FIG. 6A.

Here, when the monochrome multivalue process is executed when a shadow is generated in a center portion of the book, a pseudo contour is generated in the center portion of the book as shown in a region E100 in FIG. 6B. In this case, by converting the grayscale image to a monochrome multivalue image, the user recognizes change in luminance in a form of a staircase.

The pseudo contour determination section 218 includes a pseudo contour detection section 2182 and a pseudo contour evaluation section 2184, as shown in FIG. 2. The pseudo contour detection section 2182 detects pixels (edges) that can be considered to constitute a pseudo contour. The pseudo contour evaluation section 2184 determines whether a pseudo contour is generated when a monochrome multivalue process is performed on the input grayscale image based on a result of the detection performed by the pseudo contour detection section 2182. The process performed by the pseudo contour determination section 218 will be described below.

The gradation reproduction processing section 220 performs a gradation reproduction process (halftone generation process) by performing the monochrome binarization process or the monochrome multivalue process on image data of the grayscale image. The gradation reproduction processing section 220 includes a gradation reproduction process selection section 2202, a monochrome multivalue processing section 2204, and a monochrome binarization processing section 2206, as shown in FIG. 2.

The gradation reproduction process selection section 2202 selects one of the monochrome binarization process and the monochrome multivalue process to be performed on the grayscale image data as the gradation reproduction process. Specifically, the gradation reproduction process selection section 2202 selects (determines) the gradation reproduction process based on signals (determination signals) indicating results of the determination output from the intermediate pixel evaluation section 2144, the photographic region rate evaluation section 2164, and the pseudo contour evaluation section 2184.

For example, when selecting the monochrome binarization process to be performed on the grayscale image, the gradation reproduction process selection section 2202 outputs, to the monochrome binarization processing section 2206, a signal (monochrome binarization signal) indicating that the monochrome binarization process is to be performed on the input grayscale image. On the other hand, when selecting the monochrome multivalue process to be performed on the grayscale image, the gradation reproduction process selection section 2202 outputs, to the monochrome multivalue processing section 2204, a signal (monochrome multivalued signal) indicating that the monochrome multivalue process is to be performed on the input grayscale image.

Note that, when the gradation reproduction process selection section 2202 selects (determines) not to perform any of the monochrome binarization process and the monochrome multivalue process on the grayscale image, a monochrome multivalued signal and a monochrome binarization signal are not output. In this case, the grayscale image input to the image output section 222 is output from the image output section 222 as it is.

The monochrome multivalue processing section 2204 executes the monochrome multivalue process on the image data. For example, the monochrome multivalue processing section 2204 refers to the pixel values of the individual pixels of the image data and converts the pixel values to predetermined pixel values based on a predetermined rule. For example, the predetermined rule is, for example, to convert pixel values 0 to 63 of pixels to 0 and pixel values 64 to 127 of pixels to 96, pixel values 128 to 191 of pixels to 160, and pixel values 192 to 255 of pixels to 255.

The monochrome binarization processing section 2206 executes the monochrome binarization process on the image data. For example, when the pixel value is 0 to 255 and 127 is used as the threshold value, the monochrome binarization processing section 2206 converts pixels with pixel values of 0 to 127 (below the threshold value) included in the image data into pixels with pixel values of 0 (black pixels), and converts pixels with pixel values of 128 to 255 included in the image data into pixels with pixel values of 255 (white pixels).

The rule for converting pixel values in the monochrome multivalue process and the threshold value in the monochrome binarization process may be determined in advance or may be selected by the user. Furthermore, the monochrome multivalue processing section 2204 and the monochrome binarization processing section 2206 may automatically determine the rule and the threshold value based on the input image data and the specifications and capabilities of the image processing device 20.

The image output section 222 outputs the image data to the image printing device 30 and the image transmission/reception device 40. In this embodiment, when the image data input by the image input section 202 is image data of a monochrome image, the image output section 222 outputs any of image data of a grayscale image, image data of a monochrome binary image, and image data of a monochrome multivalued image.

Specifically, the image output section 222 receives an input of a grayscale image from the image input section 202. In addition to this, the image output section 222 accepts input of a monochrome binary image output from the monochrome binarization processing section 2206 and a monochrome multivalued image output from the monochrome multivalue processing section 2204.

When receiving a monochrome multivalued image, the image output section 222 outputs the image data of the monochrome multivalued image. When receiving a monochrome binary image, the image output section 222 outputs the image data of the monochrome binary image. When none of the monochrome multivalued image and the monochrome binary image are input, the image output section 222 outputs the image data of the grayscale image.

Note that the intermediate pixel determination section 214, the photographic region size determination section 216, and the pseudo contour determination section 218 included in the image processing device 20 determine whether the gray scale image has a feature that causes a predetermined defect other than character crushing when output is performed with a reduced number of gradations.

The intermediate pixel determination section 214 is a functional section for determining, when a grayscale image is converted into a monochrome binary image, whether the grayscale image has a feature that causes a defect of black-out. When the intermediate pixel determination section 214 determines that data on an image includes a predetermined number of intermediate pixels or more, the control section 60 performs control such that a grayscale image is output since the image has a feature that causes black-out.

The photographic region size determination section 216 is a functional section for determining, when a grayscale image is converted into a monochrome multivalued image, whether the grayscale image has a feature that causes a defect of increase in file size. Here, when image data including a photographic region of a certain size is output, a reversal phenomenon may occur in which a file size of a file in a monochrome multivalued (posterization) TIFF (Tagged Image File Format) format is larger than a file size of a file in a JPEG (Joint Photographic Experts Group) format of a grayscale image. This is because, although the TIFF format requires fewer bits to represent pixel values than the JPEG format, a larger number of portions where pixel values are discontinuous are included particularly in a photographic region. Therefore, when deflate compression is performed, an amount of data is likely to be increased. Therefore, the file size becomes larger when image data including a photographic region of a certain size is output in a TIFF format than when the image data is output in a JPEG format, which is lossy compression. Therefore, the control section 60 determines that image data that is determined by the photographic region size determination section 216 to include a photographic region at a predetermined rate or more has a feature that increases a file size by the monochrome multivalue process and performs control such that a grayscale image is output.

The pseudo contour determination section 218 is a functional section for determining, when a grayscale image is converted into a monochrome multivalued image, whether the grayscale image has a feature that causes a defect of a pseudo contour. The control section 60 performs control such that a grayscale image is to be output when the pseudo contour determination section 218 determines that the grayscale image is determined to have a feature that generates a pseudo contour.

The image printing device 30 is an output device (printing device) that forms and outputs a colored image on a recording sheet (such as recording paper) based on image data output from the image processing device 20, by using a thermal transfer method, an electrophotography method, an inkjet method, or the like. The image printing device 30 functions as an image former in the present disclosure.

The image transmission/reception device 40 communicates with other devices. The image transmission/reception device 40 is constituted by a device capable of performing communication, such as a network card or a modem. The image transmission/reception device 40 may be connected to a communication network, such as a public line network, a local area network (LAN), or the Internet, which is not shown in the figure. The image transmission/reception device 40 transmits image data output by the image processing device 20 to an external device via the communication network by means of a communication method, such as a facsimile or an electronic mail.

The image transmission/reception device 40 may receive image data from another device by the communication method, such as a facsimile, and input the received image data to the image processing device 20. In this case, the image processing device 20 performs processing, such as a rotation process and a resolution conversion process, on the received image data. The image processing device 20 outputs the image data subjected to predetermined processing to the image printing device 30 and the image transmission/reception device 40.

The operation panel 50 is a device that functions as an interface between the image forming apparatus 1 and the user. The operation panel 50 includes an operation section 52 that receives user operations and a display section 54 that displays various information.

The operation section 52 includes, for example, a physical button and an input device that detects a touch input. Any method may be employed as a method for detecting a touch input as long as the method is a common detection method, such as a resistive film type, an infrared type, an electromagnetic induction type, or a capacitive type.

The display section 54 is constituted by a display device, such as a liquid crystal display (LCD), an organic electroluminescence (EL) panel, or a micro light emitting diode (LED) display.

The control section 60 is a functional section for controlling the entire image forming apparatus 1. The control section 60 realizes various functions by reading and executing various programs stored in the storage section 204 described below, and includes one or more computing devices (such as a central processing unit (CPU)).

The control section 60 is connected to the image reading device 10, the image processing device 20, the image printing device 30, the image transmission/reception device 40, and the operation panel 50, and controls these devices to execute various processes performed in the image forming apparatus 1.

1.2 Flow of Processing 1.2.1 Outline of Processing

Next, a flow of the processing executed by the image processing device 20 in this embodiment will be described with reference to the accompanying drawings. First, an overview of a processing flow according to this embodiment will be described with reference to FIG. 2.

The image input section 202 generates image data and performs ACS determination. When the image data corresponds to a monochrome image, the image input section 202 inputs a grayscale image to the intermediate pixel determination section 214, the photographic region size determination section 216, the pseudo contour determination section 218, the image output section 222, the monochrome multivalue processing section 2204, and the monochrome binarization processing section 2206.

The pseudo contour determination section 218 inputs a determination signal A, that indicates whether a pseudo contour is generated when the input grayscale image is converted into a monochrome multivalued image, to the gradation reproduction process selection section 2202. The photographic region size determination section 216 inputs a determination signal B, that indicates whether the photographic region rate is equal to or larger than a predetermined rate, to the gradation reproduction process selection section 2202. The intermediate pixel determination section 214 inputs a determination signal C, that indicates whether the number of intermediate pixels included in the image data is equal to or larger than the number of pixels for determination, to the gradation reproduction process selection section 2202.

The gradation reproduction process selection section 2202 selects the gradation reproduction process based on the input determination signal and outputs a monochrome binary signal or a monochrome multivalued signal. The monochrome binarization processing section 2206 performs a monochrome binarization process on the grayscale image based on the monochrome binarization signal input from the gradation reproduction process selection section 2202, and outputs image data subjected to the processing (monochrome binary image) to the image output section 222. The monochrome multivalue processing section 2204 performs a monochrome multivalue process on the grayscale image based on the monochrome multivalued signal input from the gradation reproduction process selection section 2202, and outputs image data subjected to the processing (monochrome multivalued image) to the image output section 222.

The image output section 222 outputs image data based on image data input from another functional section. Specifically, when image data of a monochrome multivalued image or a monochrome binary image is input, the input image data is output. When none of the monochrome multivalued image and the monochrome binary image are input, the image output section 222 outputs image data of a grayscale image.

1.2.2 Main Processing

Figure 7:
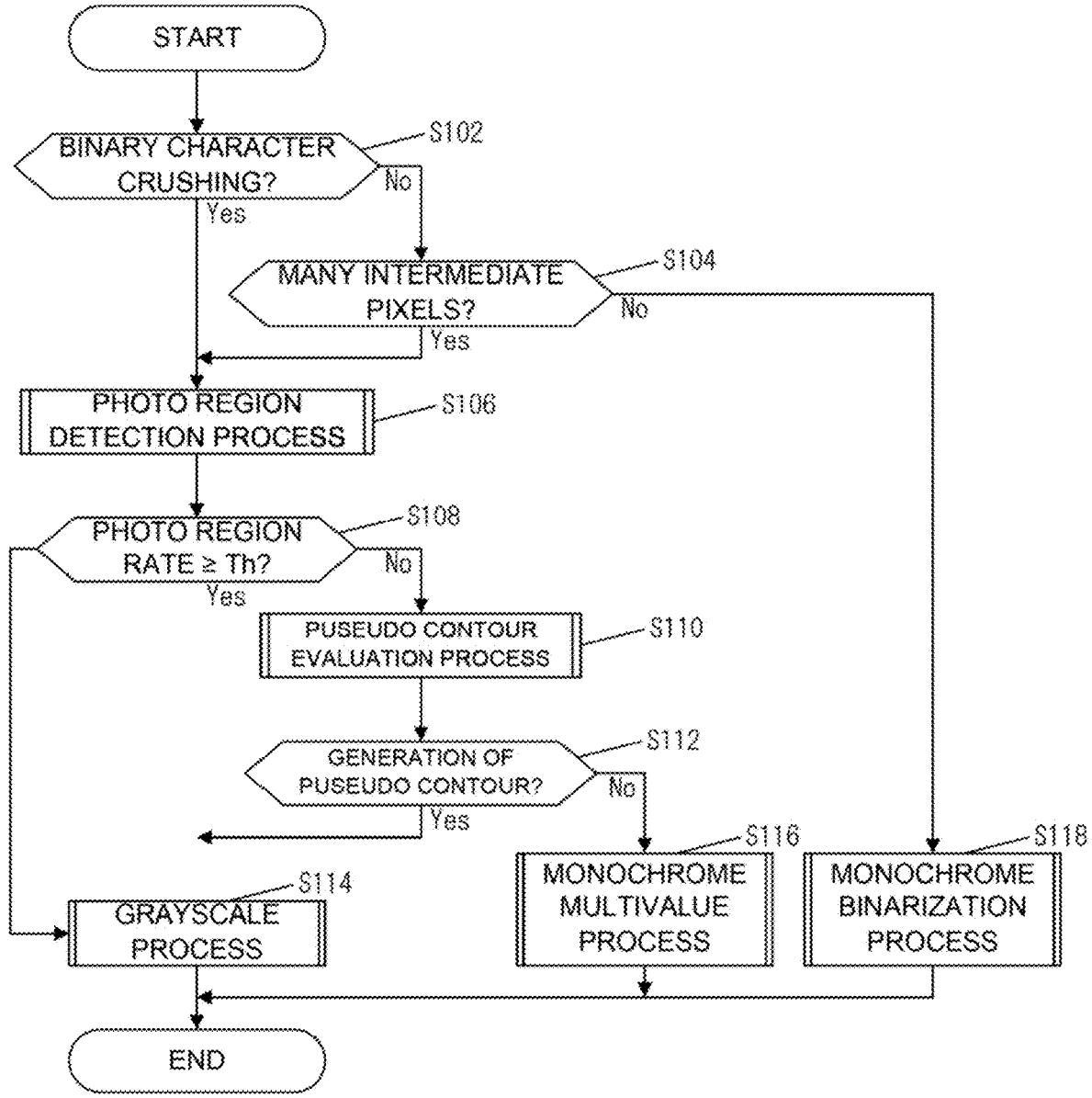
FIG. 7 is a flowchart illustrating a flow of a process according to the first embodiment.

Next, referring to FIG. 7, a flow of the processing (main processing) executed by the control section 60 in a case where it is determined that image data of a monochrome image is input to the image input section 202 and image data of a grayscale image is output from the image input section 202 will be described.

First, the control section 60 determines, via the character crushing determination section 212, whether character crushing occurs when a grayscale image is converted into a monochrome binary image (step S102).

When it is determined that character crushing does not occur in conversion to a monochrome binary image, the control section 60 determines whether the number of intermediate pixels is large via the intermediate pixel determination section 214 (from NO in step S102 to step S104). When the number of intermediate pixels is small, the control section 60 performs the monochrome binarization process on the image data (from NO in step S104 to step S118).

Specifically, the control section 60 inputs a determination signal C indicating that the number of intermediate pixels is small to the gradation reproduction process selection section 2202. The gradation reproduction process selection section 2202 selects to perform the monochrome binarization process based on the input determination signal C, and outputs a monochrome binarization signal to the monochrome binarization processing section 2206. The monochrome binarization processing section 2206 performs the monochrome binarization process on the grayscale image based on the monochrome binarization signal. As a result, image data of a monochrome binary image is input to the image output section 222. The image output section 222 outputs image data of a monochrome binary image. As a result, the image processing device 20 outputs image data of an image obtained by performing the monochrome binarization process on the grayscale image.

On the other hand, when it is determined, in step S102, that character crushing occurs in conversion to a monochrome binary image (step S102; YES), or when it is determined, in step S104, that the number of intermediate pixels is large (step S104; YES), the control section 60, via the photographic region detection section 2162, performs a photographic region detection process on the grayscale image (step S106). Subsequently, the control section 60 determines, via the photographic region rate evaluation section 2164, whether the photographic region rate based on the photographic region detected in step S106 is equal to or larger than a threshold value Th, which is a predetermined rate (step S108).

Here, assuming that it is determined in step S108 that the image data includes a photographic region to some extent (the photographic region rate is equal to or larger than the threshold value Th), the image data is uniquely converted to JPEG irrespective of generation of a pseudo contour.

In this way, image data may be output at high speed without making a special determination. Furthermore, when the photographic region included in the image data is small and no pseudo contour is generated, a monochrome multivalued image may be output. Accordingly, the control section 60 may output the image data by a processing method that is best in terms of a file size and image quality.

Therefore, in step S108, when the photographic region rate is equal to or larger than the threshold value Th, the control section 60 performs a grayscale process on the image data (from YES in step S108 to step S114).

Specifically, the control section 60 inputs a determination signal B, that indicates whether the photographic region rate is equal to or larger than a predetermined rate, to the gradation reproduction process selection section 2202. The gradation reproduction process selection section 2202 selects not to perform any of the monochrome binarization process and the monochrome multivalue process based on the input determination signal B. As a result, only grayscale image data is input to the image output section 222. The image output section 222 outputs the image data of the grayscale image. Consequently, the image processing device 20 outputs image data corresponding to the grayscale image.

Figure 8:
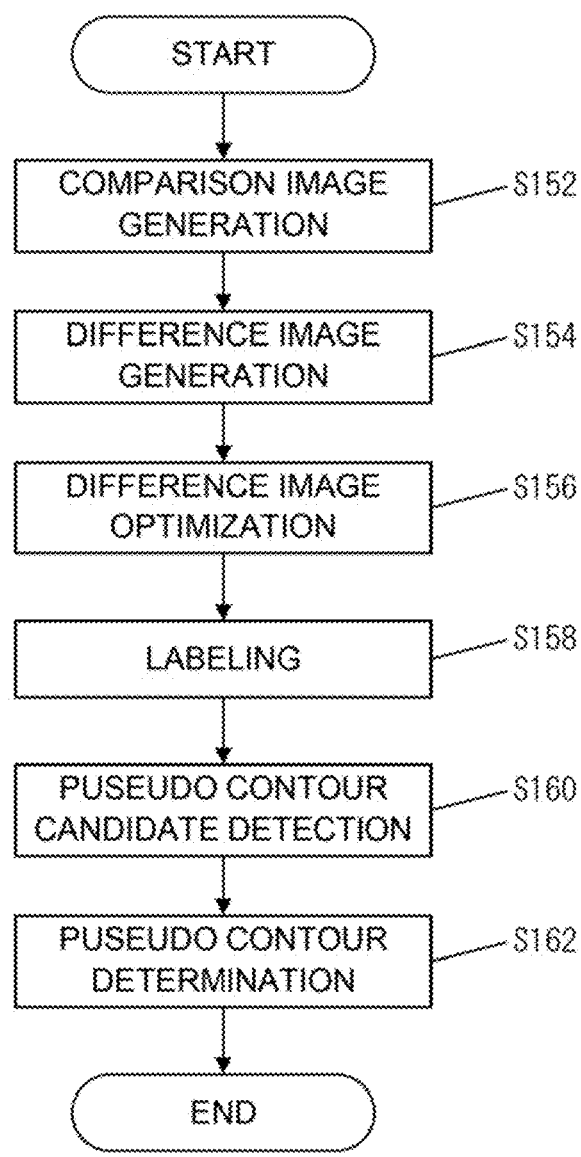
FIG. 8 is a flowchart illustrating a flow of a pseudo contour evaluation process according to the first embodiment.

On the other hand, in step S108, when the photographic region rate is smaller than the threshold value Th, the control section 60 performs a pseudo contour evaluation process through the pseudo contour determination section 218 (from NO in step S108 to step S110). The pseudo contour evaluation process will be described with reference to FIG. 8.

First, the pseudo contour detection section 2182 generates a comparison image (step S152). The comparison image is to be compared with a grayscale image in order to determine whether a pseudo contour is generated, and is specifically obtained by executing the monochrome multivalue process on a grayscale image (monochrome multivalued image).

Next, the pseudo contour detection section 2182 generates a difference image based on a difference between the grayscale image and the comparison image generated in step S152 (step S154). For example, the pseudo contour detection section 2182 calculates, for each pixel of the grayscale image, a difference between a pixel value of the pixel and a pixel value of a pixel at the corresponding position in the comparison image. Then, the pseudo contour detection section 2182 generates an image (difference image) having the differences as pixel values.

In the difference image, for example, the pixel values of the pixels where the characters are represented in the original grayscale image are smaller. This is because the pixels corresponding to characters have clear edges and moderate gradation change is difficult to occur, and therefore, the differences in pixel values between the pixels in the grayscale image and the pixels in the comparison image are not large.

On the other hand, in a region where a moderate gradation change occurs, consecutive pixels in the comparison image are converted to one of predetermined types of pixel values. Therefore, the difference values between the pixels in the grayscale image and the pixels in the comparison image are large. Here, the pixels included in the region where the moderate gradation change continuously occurs and which are converted to different types of pixel values in the comparison image appear as lines (edges) in the difference image.

Subsequently, the pseudo contour detection section 2182 optimizes the difference image generated in step S154 (step S156). For example, by performing an expansion and contraction process on the difference image, the pseudo contour detection section 2182 may connect a plurality of lines that appear in the difference image and are broken without being connected in places into a single line. Note that the pseudo contour detection section 2182 may reduce noise appearing in the difference image or sharpen the difference image. Accordingly, in this embodiment, the process of modifying the difference image into an image suitable for pseudo contour detection is referred to as optimization.

Next, the pseudo contour detection section 2182 performs labeling on a line segment connecting pixels with large pixel values in the difference image (step S158). The labeling corresponds to a process of extracting line segments to be used to determine presence or absence of a pseudo contour.

For example, based on a result of the region determination performed by the region determination processing section 206, the labeling is performed on line segments included in a character region in the difference image and having a predetermined length or longer. This allows the pseudo contour detection section 2182 to ignore line segments generated in the photographic region or short line segments in the difference image.

The pseudo contour detection section 2182 calculates a position and a length of a line segment for each labeled line segment, and associates the line segment with information on the position and the length of the line segment.

In this way, the pseudo contour detection section 2182 detects (extracts) the labeled line segments as pseudo contour candidates (step S160).

The pseudo contour evaluation section 2184 determines whether a pseudo contour is generated when the monochrome multivalue process is performed on the grayscale image based on the pseudo contour candidates detected by the pseudo contour detection section 2182 (step S162).

For example, the pseudo contour detection section 2182 determines that a pseudo contour is generated when a predetermined condition is satisfied based on lengths, the numbers, orientations, and the like of the line segments detected as the pseudo contour candidates. The predetermined condition is, for example, a case where, in the line segments detected as the pseudo contour candidates, a predetermined number (e.g., three or more) of line segments in a predetermined direction (e.g., in a vertical direction of the image data) that have a predetermined length (e.g., 50% or more of a height of the image data) are included. The predetermined condition may be determined in advance or may be settable by the user. Note that a direction of a line segment may be determined based on an aspect ratio of a rectangle with the line segment connecting a start position and an end position of the line segment as a diagonal.

Returning back to FIG. 7, when a pseudo contour is generated, that is, when it is determined in step S162 that a pseudo contour is generated, the control section 60 executes a grayscale process (from YES in step S112 to step S114). Specifically, the control section 60 inputs a determination signal A indicating that a pseudo contour is generated to the gradation reproduction process selection section 2202. The gradation reproduction process selection section 2202 selects not to perform any of the monochrome binarization process and the monochrome multivalue process based on the input determination signal A. As a result, only grayscale image data is input to the image output section 222. The image output section 222 outputs the image data of the grayscale image. Consequently, the image processing device 20 outputs image data corresponding to the grayscale image.

On the other hand, when a pseudo contour is not generated, that is, when it is determined in step S162 that a pseudo contour is not generated, the control section 60 executes the monochrome multivalue process (from NO in step S112 to step S116). Specifically, the control section 60 inputs a determination signal A indicating that a pseudo contour is generated to the gradation reproduction process selection section 2202. The gradation reproduction process selection section 2202 selects to perform the monochrome multivalue process based on the input determination signal A. The monochrome multivalue processing section 2204 performs the monochrome multivalue process on the grayscale image based on the monochrome multivalued signal. As a result, image data of a monochrome mutivalued image is input to the image output section 222. The image output section 222 outputs the image data of the monochrome multivalue image. Consequently, the image processing device 20 outputs monochrome multivalued image data.

Note that the order of the steps may be changed or some of the steps may be omitted to the extent that there is no contradiction, even other than as described above. For example, in the above-described processing flow, the image data is output by a corresponding processing method each time the determination results of the individual determination sections of the character crushing determination section 212, the intermediate pixel determination section 214, the photographic region size determination section 216, and the pseudo contour determination section 218 are output. However, for example, the control section 60 may acquire the determination result of the character crushing determination section 212 and the determination results (determination signal A, determination signal B, and determination signal C) of the intermediate pixel determination section 214, the photographic region size determination section 216, and the pseudo contour determination section 218, and select a method for processing image data based on a combination of the determination results.

According to this embodiment, the image processing device 20 may avoid character crushing when the monochrome binarization process is performed on image data, and furthermore, suppress deterioration of image quality caused by black-out in a photographic region.

Furthermore, the image processing device 20 may perform switching between the monochrome multivalue process and the grayscale process according to a rate of a photographic region included in image data. Here, a case where a plurality of documents are read and output by the image reading device 10 in a photo-oriented (image quality priority) mode, which is a mode in which monochrome multivalued images or grayscale images are output, without the monochrome binarization process for prioritizing gradation reproduction, will be described as an example. In this case, a reversal phenomenon may occur where a file size of a grayscale image is increased when a monochrome multivalue image is selected to reduce the file size of the grayscale image. The phenomenon is coped with by a simple method of performing switching between the monochrome multivalue process and the grayscale process based on a rate of a photographic region included in image data. Accordingly, image data may be output using a processing method that minimizes the file size when the image data is output in the photo-oriented mode.

Furthermore, according to this embodiment, the image processing device 20 may avoid the pseudo contour from being visible to the user when the user desires to output the image data of the monochrome multivalued image in order to reduce the file size of the output image data. In other words, the image processing device 20 of this embodiment does not forcibly perform the monochrome multivalue on image data in which pseudo contours are generated by the monochrome multivalue, but performs switching to the grayscale process. Accordingly, the user may avoid the phenomenon of recognizing a pseudo contour generated in the shadow region that appears in a floating portion in the center portion during book scanning or feeling the portion as an eyesore.

2. Second Embodiment

Next, a second embodiment will be described. The second embodiment is different from the first embodiment in that the number of gradations of the image data to be output is determined according to a rate of a photographic region and presence or absence of a pseudo contour. In the second embodiment, FIG. 2 in the first embodiment is replaced with FIG. 9, and FIG. 7 in the first embodiment is replaced with FIG. 10. The same functional sections and processing will be denoted by the same reference numerals, and descriptions thereof are omitted.

An image processing device 20 in this embodiment may be configured by omitting the character crushing determination section 212 and the intermediate pixel determination section 214 from the functional configuration shown in FIG. 1 according to the first embodiment.

Figure 9:
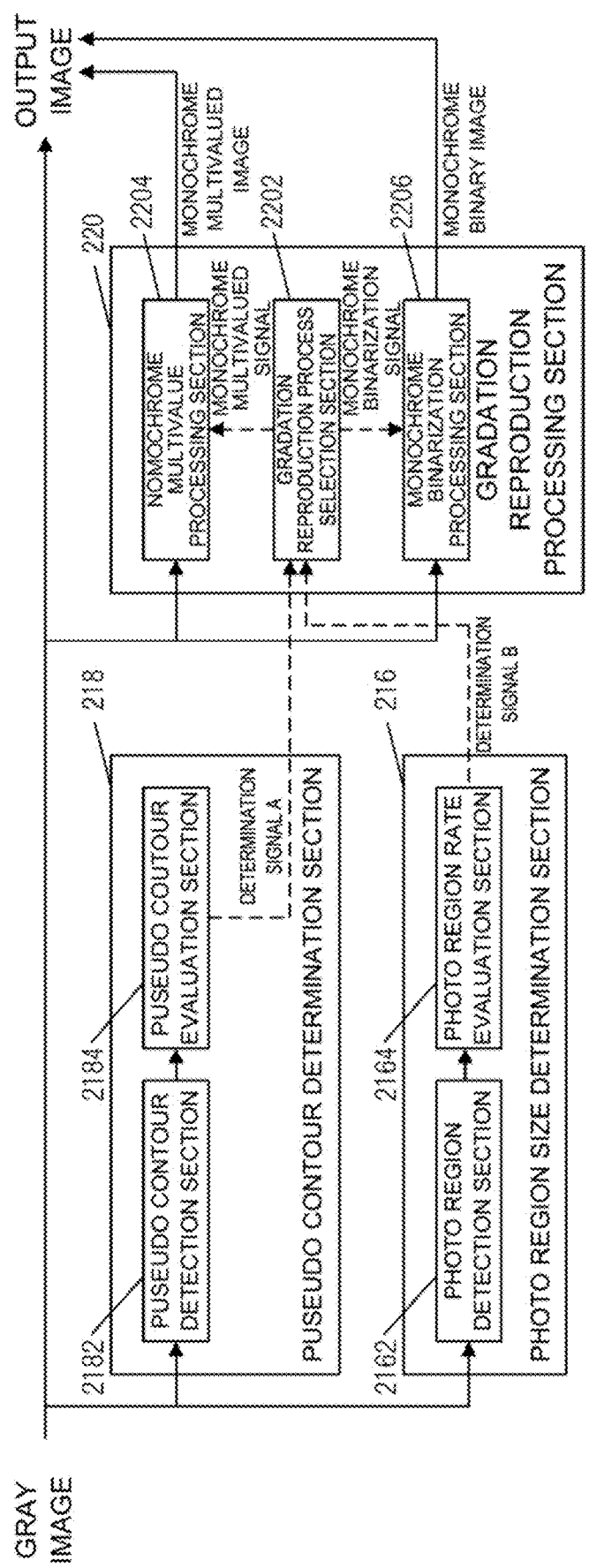
FIG. 9 is a diagram schematically illustrating a process according to a second embodiment.

An overview of a processing flow according to this embodiment will be described with reference to FIG. 9. In this embodiment, image data generated by an image input section 202 is supplied to a photographic region size determination section 216, a pseudo contour determination section 218, an image output section 222, a monochrome multivalue processing section 2204, and a monochrome binarization processing section 2206.

The pseudo contour determination section 218 supplies a determination signal A, that indicates whether a pseudo contour is generated when an input grayscale image is converted into a monochrome multivalued image, to a gradation reproduction process selection section 2202. The photographic region size determination section 216 inputs a determination signal B, that indicates whether a photographic region rate is equal to or larger than a predetermined rate, to the gradation reproduction process selection section 2202. The gradation reproduction process selection section 2202 selects a gradation reproduction process based on the input determination signal B. The monochrome multivalue processing section 2204 or the monochrome binarization processing section 2206 performs a monochrome multivalue process or the monochrome binarization process on an input grayscale image based on the selected gradation reproduction process, and outputs image data subjected to the processing to the image output section 222. The image output section 222 outputs the image data based on image data input from another functional section.

Figure 10:
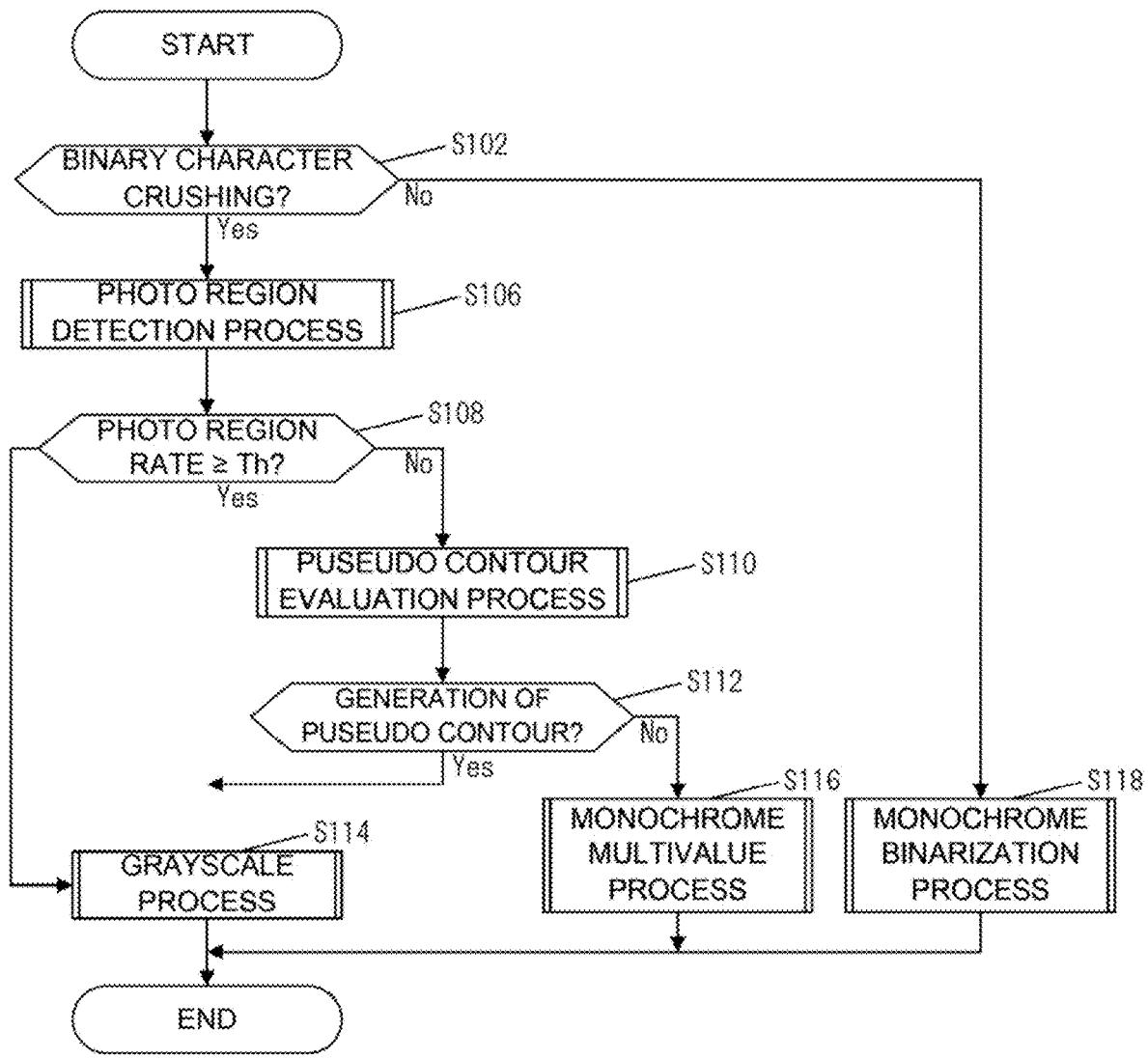
FIG. 10 is a flowchart illustrating a flow of a process according to the second embodiment.

Referring to FIG. 10, a flow of processing (main processing) executed by a control section 60 in a case where it is determined that image data of a monochrome image is input to the image input section 202 and image data of a grayscale image is output from the image input section 202 will be described.

First, the control section 60 determines, via a character crushing determination section 212, whether character crushing occurs when the grayscale image is converted into a monochrome binary image (step S102). When the character crushing does not occur in the monochrome binary image, the control section 60 performs a monochrome binarization process on the image data (from NO in step S102 to step S118).

On the other hand, when character crushing occurs in the monochrome binary image, the control section 60 executes a photographic region detection process on the grayscale image via a photographic region detection section 2162 (YES in step S102 to step S106). Subsequently, the control section 60 determines, via a photographic region rate evaluation section 2164, whether a photographic region rate of the photographic region detected in step S106 is equal to or larger than a predetermined threshold value Th, (step S108).

In step S108, when the photographic region rate is equal to or larger than the threshold value Th, the control section 60 performs a grayscale process on the image data (from YES in step S108 to step S114).

When the photographic region rate is smaller than the threshold value Th in step S108, the control section 60 performs a pseudo contour evaluation process through the pseudo contour determination section 218 (from NO in step S108 to step S110).

When a pseudo contour is generated, the control section 60 performs a grayscale process (from YES in step S112 to step S114). On the other hand, when a pseudo contour is not generated, the control section 60 performs a monochrome multivalue process (from NO in step S112 to step S116).

According to this embodiment, the image processing device 20 may avoid a pseudo contour from being visible to a user when the user desires to output image data of a monochrome multivalued image in order to reduce a file size of the output image data.

3. Third Embodiment

Next, a third embodiment will be described. The third embodiment is different from the first embodiment in that the number of gradations of image data to be output is determined according to presence or absence of a character crushing and the number of intermediate pixels. In the third embodiment, FIG. 2 in the first embodiment is replaced with FIG. 11, and FIG. 7 in the first embodiment is replaced with FIG. 12. The same functional sections and processing will be denoted by the same reference numerals, and descriptions thereof are omitted.

An image processing device 20 in this embodiment may be configured by omitting the photographic region size determination section 216 and the pseudo contour determination section 218 from the functional configuration shown in FIG. 1 according to the first embodiment.

Figure 11:
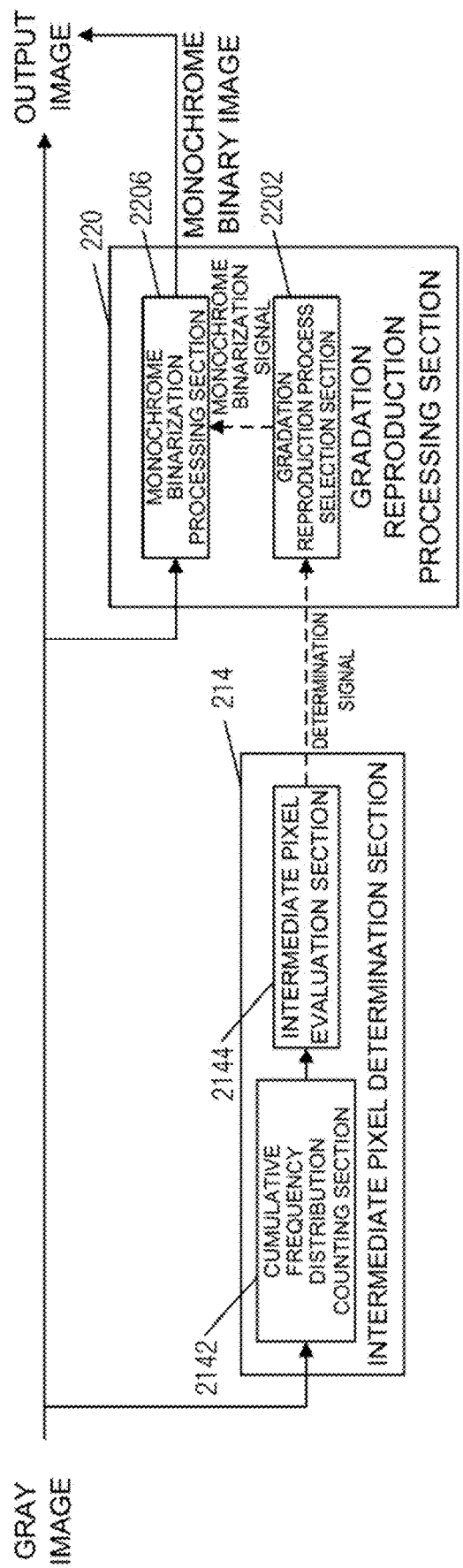
FIG. 11 is a diagram schematically illustrating a process according to a third embodiment.

An overview of a processing flow according to this embodiment will be described with reference to FIG. 11. In this embodiment, image data generated by an image input section 202 is supplied to an intermediate pixel determination section 214, an image output section 222, and a monochrome binarization processing section 2206.

The intermediate pixel determination section 214 determines whether the number of intermediate pixels included in an input grayscale image is large, and supplies a determination signal indicating a result of the determination to a gradation reproduction process selection section 2202. When receiving a determination signal indicating that the number of intermediate pixels is small, the gradation reproduction process selection section 2202 outputs a monochrome binarization signal to the monochrome binarization processing section 2206. The monochrome binarization processing section 2206 outputs image data of a monochrome binary image to an image output section 222 based on the monochrome binarization signal input from the gradation reproduction process selection section 2202. The image output section 222 outputs the image data based on image data input from another functional section.

Figure 12:
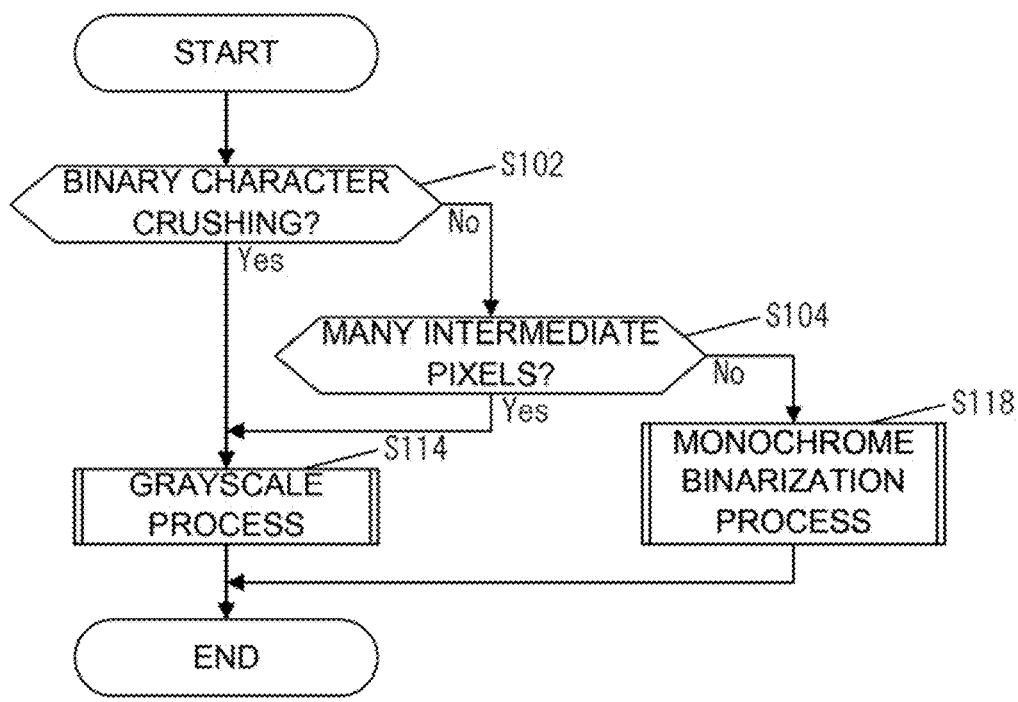
FIG. 12 is a flowchart illustrating a flow of a process according to the third embodiment.

Referring to FIG. 12, a flow of processing (main processing) executed by a control section 60 in a case where it is determined that image data of a monochrome image is input to the image input section 202 and image data of a grayscale image is output from the image input section 202 will be described.

First, the control section 60 determines, via a character crushing determination section 212, whether character crushing occurs when the grayscale image is converted into a monochrome binary image through a monochrome binarization process (step S102). When the character crushing occurs in the monochrome binary image, the control section 60 performs a grayscale process on the image data (from YES in step S102 to step S114).

On the other hand, when character crushing does not occur in the monochrome binary image, the control section 60 determines whether the number of intermediate pixels is large via an intermediate pixel determination section 214 (from NO in step S102 to step S104). When the number of intermediate pixels is large, the control section 60 performs the grayscale process on the image data (from YES in step S104 to step S114). On the other hand, when the number of intermediate pixels is small, the control section 60 performs the monochrome binarization process on the image data (from NO in step S104 to step S118).

According to this embodiment, when the image data includes a region that includes many intermediate pixels (for example, a dark photographic region), it is possible to avoid the phenomenon in which the region that includes many intermediate pixels is blacked out and the image quality deteriorates when the image data is converted to a monochrome binary image.

4. Fourth Embodiment

Next, a fourth embodiment will be described. The fourth embodiment is different from the first embodiment in that the number of gradations of image data to be output is determined according to a rate of a photographic region. In the fourth embodiment, FIG. 2 in the first embodiment is replaced with FIG. 13, and FIG. 7 in the first embodiment is replaced with FIG. 14. The same functional sections and processing will be denoted by the same reference numerals, and descriptions thereof are omitted.

An image processing device 20 in this embodiment may be configured by omitting the character crushing determination section 212, the intermediate pixel determination section 214, and the pseudo contour determination section 218 from the functional configuration shown in FIG. 1 according to the first embodiment.

Figure 13:
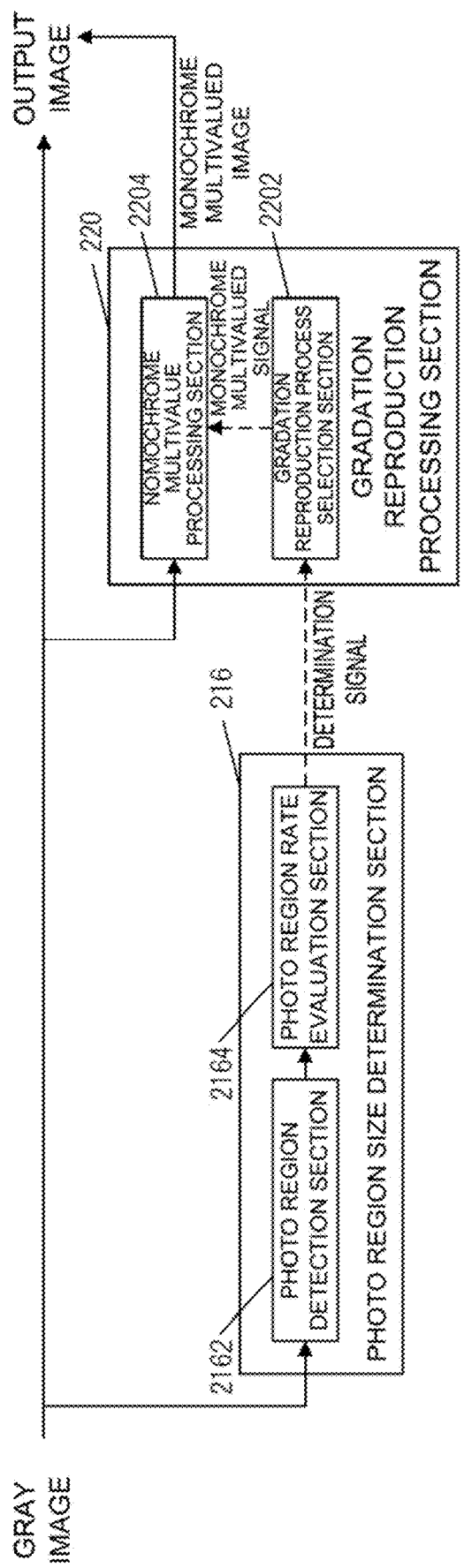
FIG. 13 is a diagram schematically illustrating a process according to a fourth embodiment.

An overview of a processing flow according to this embodiment will be described with reference to FIG. 13. In this embodiment, image data generated by an image input section 202 is supplied to a photographic region size determination section 216, an image output section 222, and a monochrome multivalue processing section 2204.

The photographic region size determination section 216 outputs a determination signal, that indicates whether a photographic region rate is equal to or larger than a predetermined rate in an input grayscale image, to a gradation reproduction process selection section 2202. When receiving the determination signal indicating that the photographic region rate is smaller than the predetermined rate, the gradation reproduction process selection section 2202 outputs a monochrome multivalued signal to the monochrome multivalue processing section 2204. The monochrome multivalue processing section 2204 outputs image data of a monochrome multivalue image to the image output section 222 based on the monochrome multivalued signal input from the gradation reproduction process selection section 2202. The image output section 222 outputs the image data based on image data input from another functional section.

Figure 14:
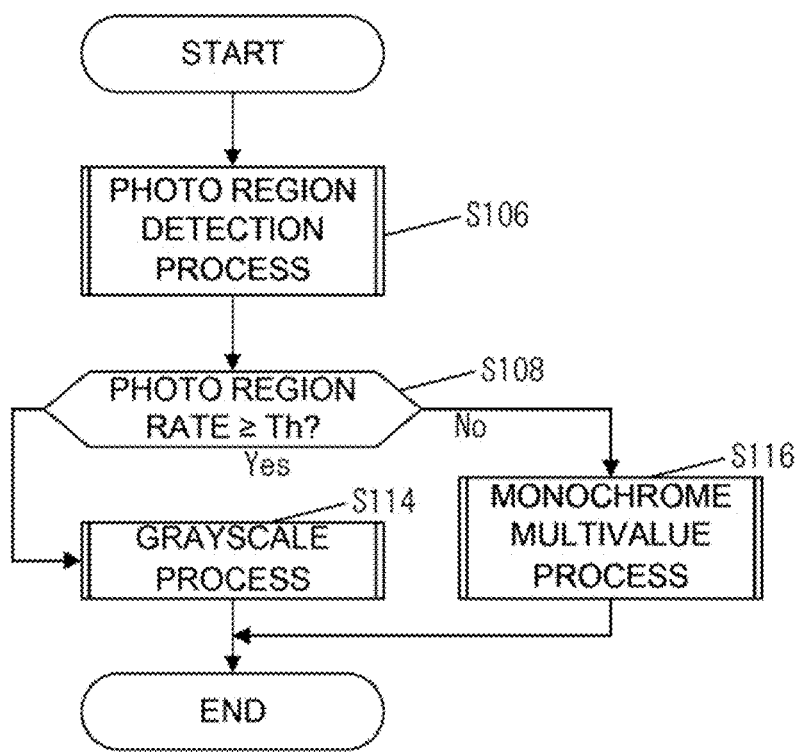
FIG. 14 is a flowchart illustrating a flow of a process according to the fourth embodiment.

Referring to FIG. 14, a flow of processing (main processing) executed by a control section 60 in a case where it is determined that image data of a monochrome image is input to the image input section 202 and image data of a grayscale image is output from the image input section 202 will be described.

First, the control section 60 executes a photographic region detection process on a grayscale image via a photographic region detection section 2162 (step S106). Subsequently, the control section 60 determines, via a photographic region rate evaluation section 2164, whether a photographic region rate of the photographic region detected in step S106 is equal to or larger than a predetermined threshold value Th, (step S108).

In step S108, when the photographic region rate is equal to or larger than the threshold value Th, the control section 60 performs a grayscale process on the image data (from YES in step S108 to step S114). On the other hand, in step S108, when the photographic region rate is smaller than the threshold value Th, the control section 60 performs a monochrome multivalue process (from NO in step S108 to step S116).

According to this embodiment, the phenomenon that a file size of a grayscale image becomes larger than it should be due to a monochrome multivalue process performed to reduce the file size of the grayscale image may be avoided by executing appropriate processing based on a rate of a photographic region included in image data.

5. Fifth Embodiment

Next, a fifth embodiment will be described. The fifth embodiment is different from the first embodiment in that it is determined whether a pseudo contour is generated when a monochrome multivalue process is executed on a grayscale image, and the number of gradations of the image data to be output is determined based on the determination. In the fifth embodiment, FIG. 2 in the first embodiment is replaced with FIG. 15, and FIG. 7 in the first embodiment is replaced with FIG. 16. The same functional sections and processing will be denoted by the same reference numerals, and descriptions thereof are omitted.

Note that an image processing device 20 in this embodiment may be configured by omitting the character crushing determination section 212, the intermediate pixel determination section 214, and the photographic region size determination section 216 from the functional configuration shown in FIG. 1 according to the first embodiment.

Figure 15:
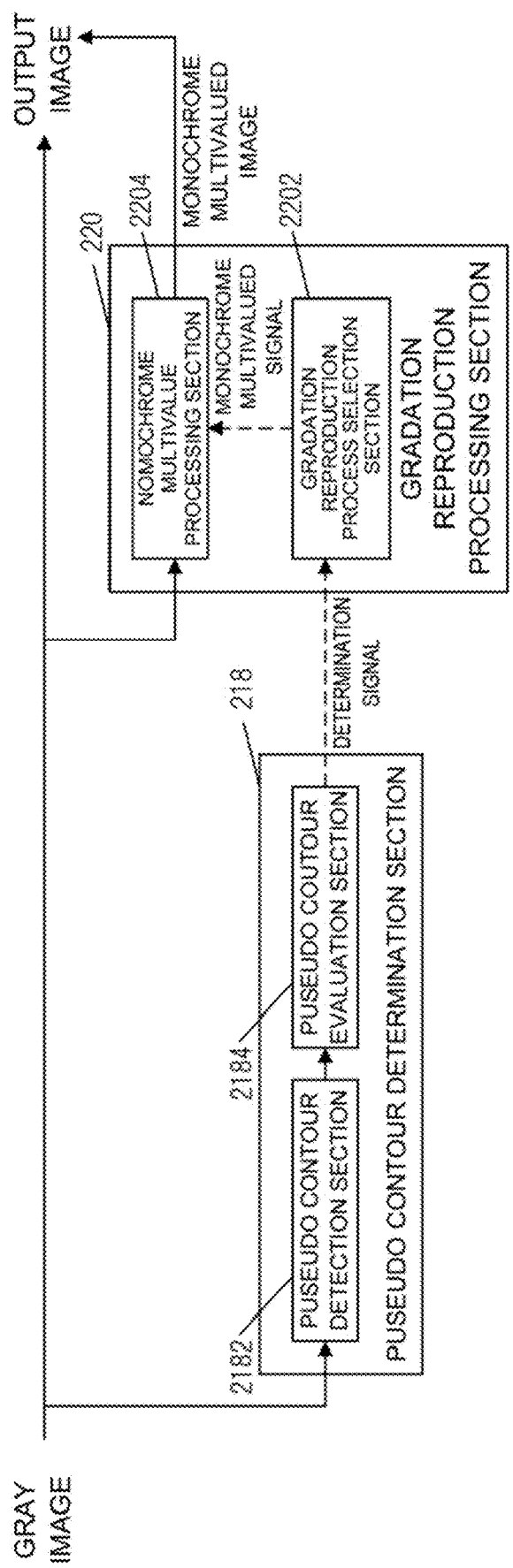
FIG. 15 is a diagram schematically illustrating a process according to a fifth embodiment.

An overview of a processing flow according to this embodiment will be described with reference to FIG. 15. In this embodiment, image data generated by an image input section 202 is supplied to a pseudo contour determination section 218, an image output section 222, and a monochrome multivalue processing section 2204.

The pseudo contour determination section 218 supplies a determination signal, that indicates whether a pseudo contour is generated when a grayscale image is converted into a monochrome multivalued image, to a gradation reproduction process selection section 2202. When receiving a determination signal indicating that the pseudo contour is not generated, the gradation reproduction process selection section 2202 outputs a monochrome multivalued signal to the monochrome multivalue processing section 2204. The monochrome multivalue processing section 2204 outputs image data of a monochrome multivalue image to the image output section 222 based on the monochrome multivalued signal input from the gradation reproduction process selection section 2202. The image output section 222 outputs the image data based on image data input from another functional section.

Figure 16:
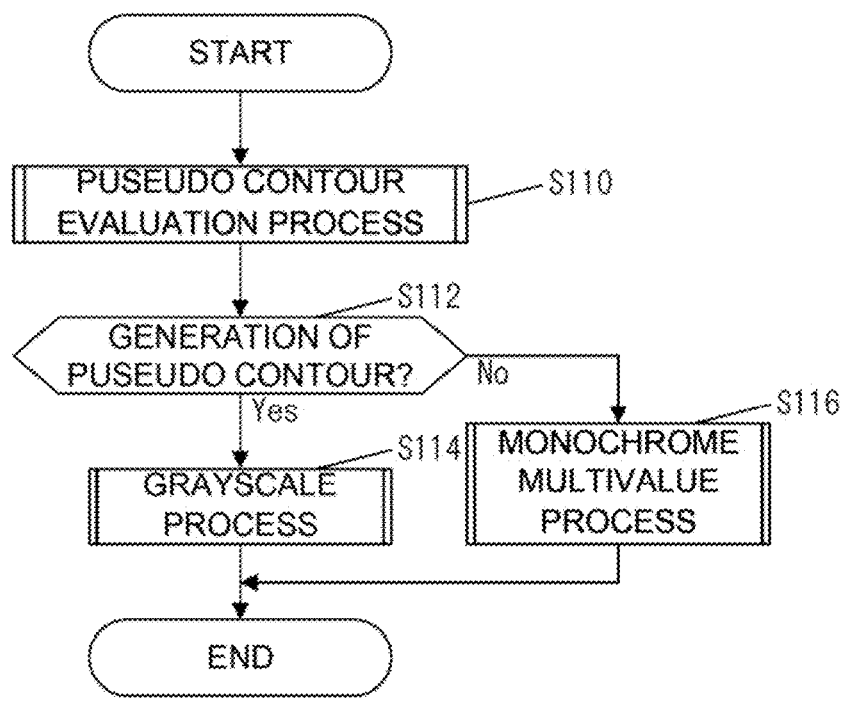
FIG. 16 is a flowchart illustrating a flow of a process according to the fifth embodiment.

Referring to FIG. 16, a flow of processing (main processing) executed by a control section 60 in a case where it is determined that image data of a monochrome image is input to the image input section 202 and image data of a grayscale image is output from the image input section 202 will be described.

First, the control section 60 executes a pseudo contour evaluation process via the pseudo contour determination section 218 (step S110). When a pseudo contour is generated, the control section 60 performs a grayscale process (from YES in step S112 to step S114). On the other hand, when a pseudo contour is not generated, the control section 60 performs a monochrome multivalue process (from NO in step S112 to step S116).

According to this embodiment, the image processing device 20 may avoid a pseudo contour from being visible to a user when the user desires to output image data of a monochrome multivalued image in order to reduce a file size of the output image data.

6. Sixth Embodiment

Next, a sixth embodiment will be described. In the sixth embodiment, in a case where character crushing does not occur when a monochrome binarization process is performed on input image data in the fourth and fifth embodiments, a monochrome binarization process is performed.

Figure 17:
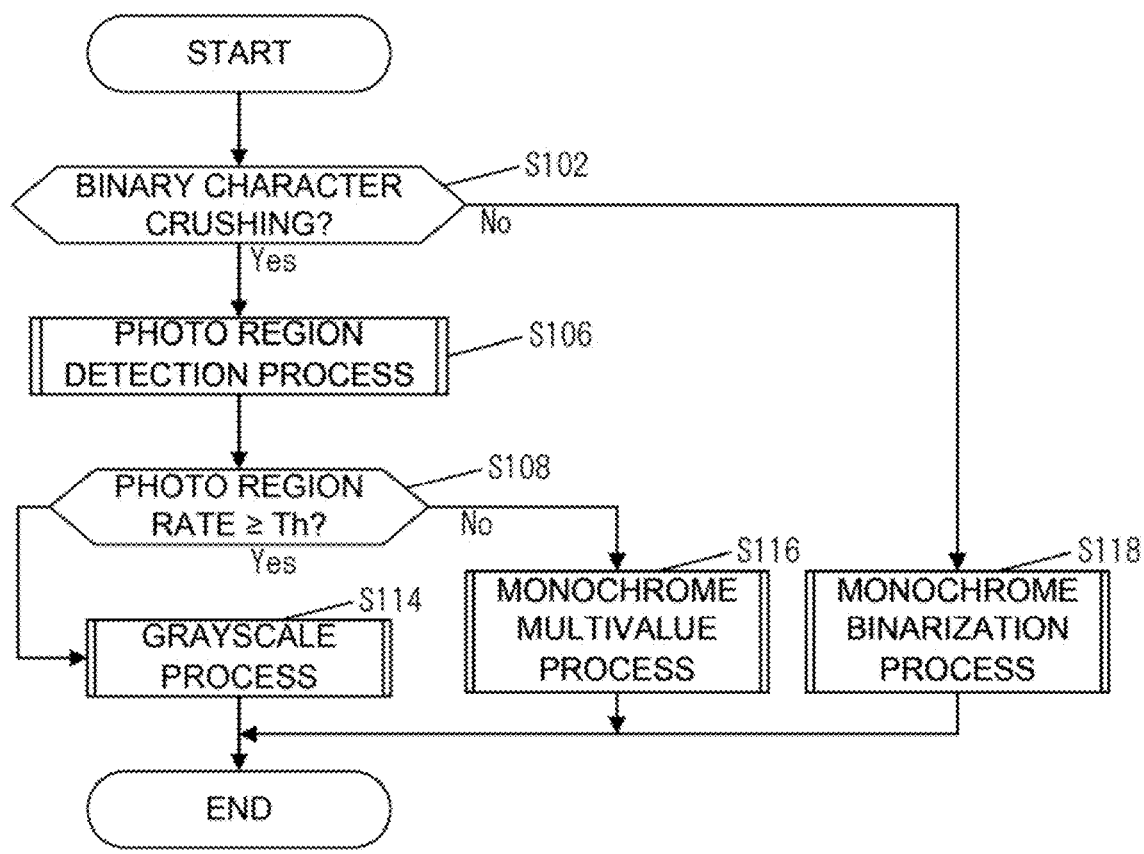
FIG. 17 is a flowchart illustrating a flow of a process according to a sixth embodiment.

FIG. 17 is a flowchart of a flow of processing (main processing) executed by a control section 60 in a case where this embodiment is applied to the fourth embodiment. As illustrated in FIG. 17, the control section 60 determines, via a character crushing determination section 212, whether character crushing occurs when the grayscale image is converted into a monochrome binary image (step S102). When the character crushing does not occur in the monochrome binary image, the control section 60 performs a monochrome binarization process on the image data (from NO in step S102 to step S118).

When character crushing occurs in step S102, the control section 60 performs the process from step S106 to step S116 shown in FIG. 14 of the fourth embodiment.

Note that the control section 60 may execute the following process as a process performed on the image data based on a determination of presence or absence of character crushing and a determination of a rate of a photographic region.

(1) When character crushing does not occur and a photographic region is less than a threshold value Th (including a case where there is no photographic region), image data is subjected to a monochrome binarization process.

(2) When character crushing occurs and a photographic region is less than the threshold value Th (including the case where there is no photographic region), image data is subjected to an error diffusion process.

(3) When character crushing occurs and the photographic region is equal to or greater than the threshold value Th, the image data is subjected to the error diffusion process or the monochrome multivalue process.

Figure 18:
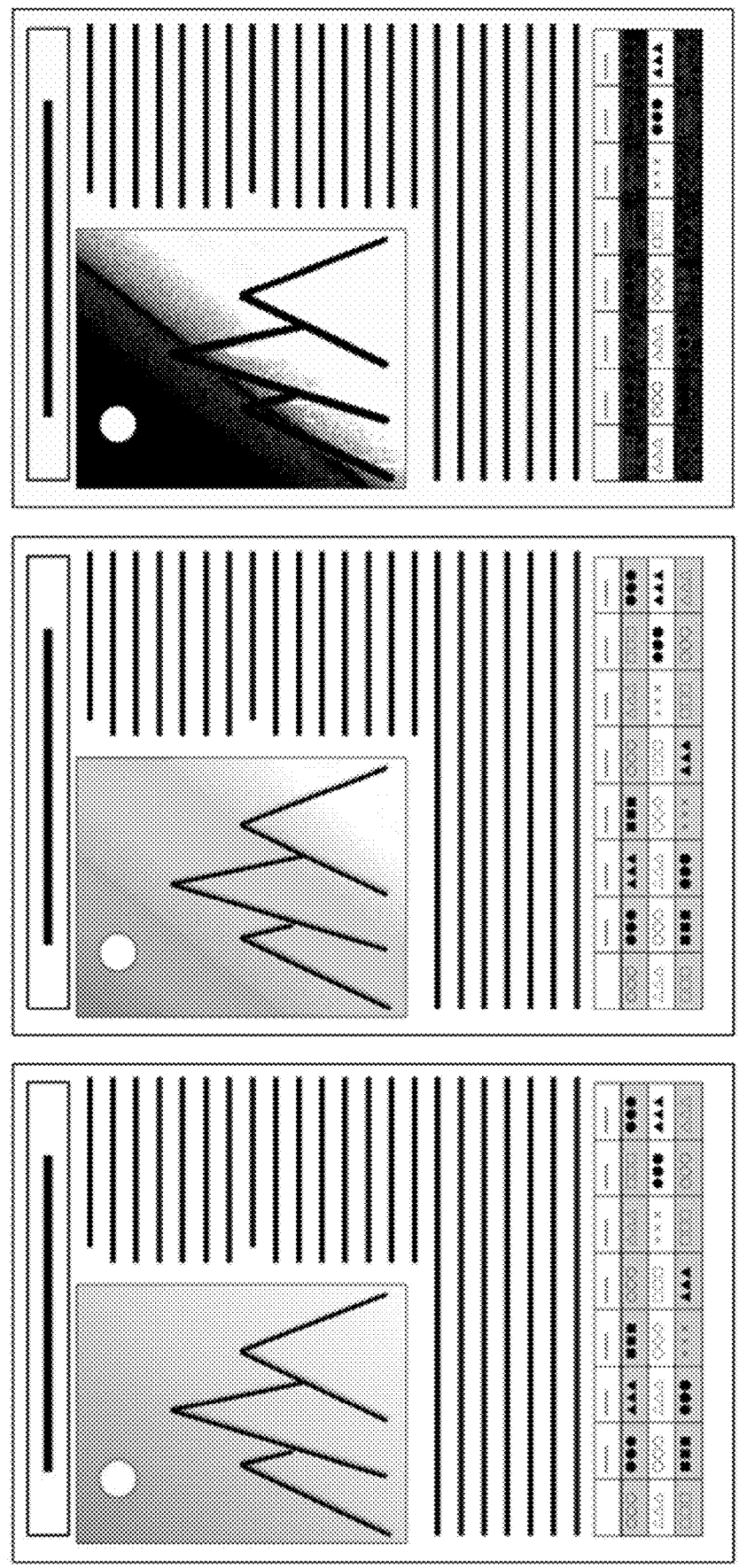
FIGS. 18A to 18C are diagrams illustrating an example of an operation according to the sixth embodiment.

FIGS. 18A to 18C are diagrams illustrating an example of an operation according to this embodiment. FIG. 18A is a diagram illustrating image data input by the image input section 202. FIG. 18B is a diagram illustrating image data obtained when the monochrome multivalue process is executed on the image data. FIG. 18C is a diagram illustrating image data obtained when the monochrome binarization process is executed on the image data.

As shown in FIG. 18B, when the monochrome multivalue process is executed on the image data, black-out does not occur in pixels included in a photographic region, and characters are not crushed. As shown in FIG. 18C, when the monochrome binarization process is executed on the image data, black-out occurs in a portion of the photographic region, but most of the characters are not crushed. The number of gradations included in the image data obtained when the monochrome binarization process is performed on the image data is smaller than that in a case where the monochrome multivalue process is performed on the image data, and therefore, a file size is generally small. Accordingly, the process to be performed on the image data may be switched according to a setting indicating whether priority is given to image quality or a file size of the image data to be output. The setting indicating whether priority is given to image quality or a file size may be switched by the user, for example.

Note that, even when this embodiment is applied to the fifth embodiment, the control section 60 performs the monochrome binarization process when character crushing does not occur in conversion from a grayscale image to a monochrome binary image. On the other hand, when character crushing occurs in conversion from a grayscale image to a monochrome binary image, the control section 60 performs the process from step S110 to step S116, which is the process shown in FIG. 16 according to the fourth embodiment.

According to this embodiment, by combining the determination of character crushing and the determination of the rate of the photographic region, optimum image data that does not cause character crushing may be output while a file size of an image is minimized. In addition, by executing the processing illustrated in this embodiment when a plurality of documents are scanned, the image processing device 20 can execute predetermined processing after converting each image data in a document into the most suitable scan data, or output the most suitable scan data.

7. Seventh Embodiment

Next, a seventh embodiment will be described. The seventh embodiment provides a function for manually setting an adjustment of a criterion of determination (determination value) or switching of content of processing for the determinations or the processing executed in the main processing shown in the first to sixth embodiments.

Figure 19:
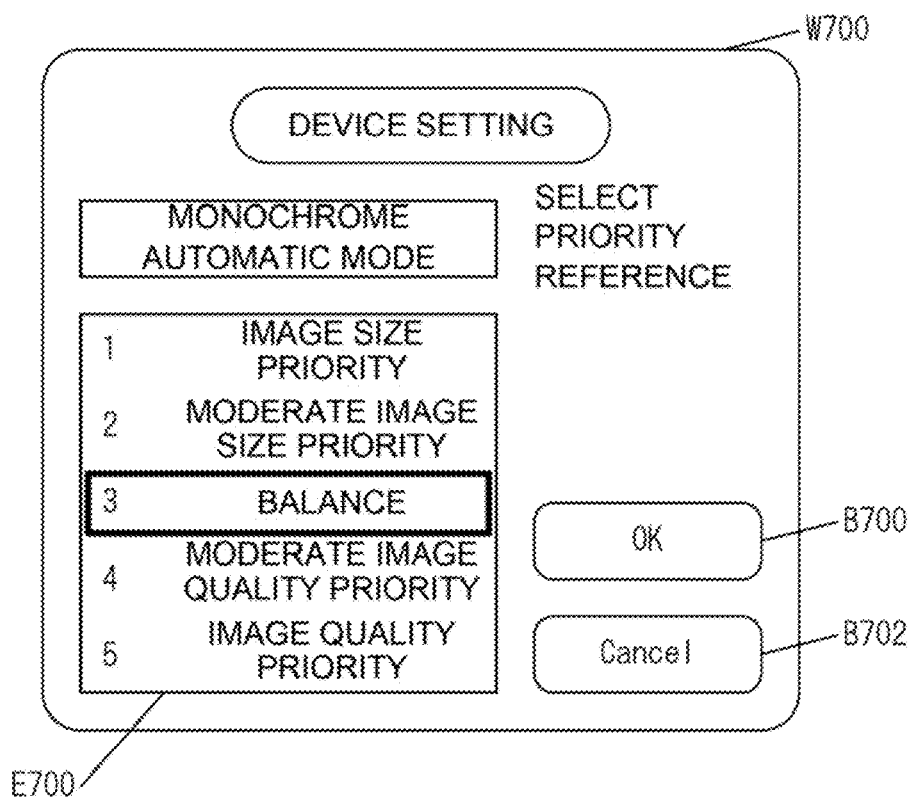
FIG. 19 is a diagram illustrating an example of an operation according to a seventh embodiment.

For example, before executing the main processing, a control section 60 displays a setting screen W700 as shown in FIG. 19 on a display section 54. The setting screen W700 displays a list E700 for selecting a criterion for determination, and has an OK button B700 for applying the selected criterion and a cancel button B702 for canceling the selection.

The list E700 displays items for selecting whether priority is to be given to reduction of a size of image data to be output or to be given to image quality of an image based on the image data to be output, or both the image size and the image quality is to be balanced. For example, as shown in FIG. 19, five levels are displayed in the list E700, with a central level being a level for making a determination that both the image size and the image quality is to be balanced. A user selects a desired level in the list E700.

Note that, as an initial setting, the control section 60 selects a level (level 3 in the example of FIG. 19) to be selected to make the determination that both the image size and the image quality are to be balanced. Note that an appropriate value is set by a designer of the image processing device 20 or the like as a determination value (e.g., a threshold value used for the determination) for making a determination that both the image size and the image quality is to be balanced.

FIGS. 20A to 20C are tables showing determination criteria and determination values (parameter sets) used by the control section 60 in response to a selected level, and the content of processing to be performed.

For example, as shown in FIG. 20A, the control section 60 may switch a determination value (parameter set) indicating a criterion to be used for a determination corresponding to the selected level. For example, the control section 60 uses a parameter set A when the level 1 (size priority) is selected, and uses a parameter set E when the level 5 (image quality priority) is selected.

In the case where priority is given to a file size, the control section 60 switches parameters of the individual determination processes so that it is easy to make a determination for a process with a smaller file size, such as monochrome multivalue or monochrome binarization. On the other hand, in the case where priority is given to image quality, the control section 60 switches the parameters of the individual determination processes so that it is easy to make a determination for a process that more sufficiently suppresses deterioration of image quality, such as grayscale conversion or monochrome multivalue conversion.

For example, the parameter set may include a value of the photographic region size threshold value (THps), which indicates a specific value of the threshold value Th used by the photographic region size determination section, as shown in FIG. 20B. In this case, a parameter set A includes THps1 as a photographic region size threshold value, and similarly, a parameter set B includes THps2, a parameter set C includes THps3, a parameter set D includes THps4, and a parameter set E includes THps5.

Here, the photographic region size threshold values are determined as follows: THps1>THps2>THps3>THps4>THps5. As a result, when THps5 is selected as the photographic region size threshold value, even if the photographic region included in the image data is small, the grayscale process is preferentially executed, and image data with priority on image quality is output. On the other hand, when THps1 is selected as the photographic region size threshold value, unless the photographic region included in the image data is large to some extent, the monochrome multivalue process is preferentially performed, and image data with a small file size is preferentially output.

As shown in FIG. 20C, the method of binarization processing may be switched according to the level. For example, when using the parameter set A, the parameter set B, and the parameter set C, the control section 60 performs the monochrome multivalue process in step S116 in the main processing. On the other hand, when the parameter set D and the parameter set E are used, the control section 60 performs an error diffusion process instead of the monochrome multivalue process in the step S116 in the main processing.

The user may adjust a level based on an image output from the image forming apparatus 1. For example, when a file size of the image data output in the initial state setting is larger than expected and it becomes difficult to attach the image data to an e-mail, the user selects a setting that determines the priority of the process to reduce the file size. Specifically, the user selects criteria, such as the Level 2 (slight image size priority) or the Level 1 (image size priority) to further reduce the size.

On the other hand, when there is a possibility that the image quality of the image data output in the initial state setting deteriorates more than expected and affects the mental image of a person who receives the image data, a setting that determines the processing that can more efficiently suppress the deterioration of the image quality is preferentially selected. Specifically, the user selects criteria, such as the Level 4 (slight image quality priority) or the Level 5 (image quality priority), to further suppress deterioration of the image quality.

According to this embodiment, the image forming apparatus can provide an environment in which determination criteria and the like can be adjusted so that a result of a determination in the main processing corresponds to a determination result in which the image data desired by the user is output. Accordingly, the user may perform switching to a gradation reproduction process that obtains a desired file size or a desired image quality or a process of outputting image data based on the number of gradations, when the image data based on the unintended process of a gradation reproduction method or the number of gradations is output.

8. Eighth Embodiment

Next, an eighth embodiment will be described. The eighth embodiment provides a function to allow a user to determine a gradation reproduction method and the number of gradations of an image to be output, after the image data to be output in the main processing described in the first to seventh embodiments is displayed on a preview screen.

In this embodiment, in a case where a mode for automatically selecting a gradation reproduction method when image data is output (monochrome automatic mode) is selected, the control section 60 displays a preview screen before outputting the image data. The gradation reproduction method refers to the number of gradations obtained when image data is output (e.g., grayscale, monochrome multivalue, monochrome binary), the gradation reproduction process to be performed (e.g., error diffusion), or a combination thereof.

Figure 21A:
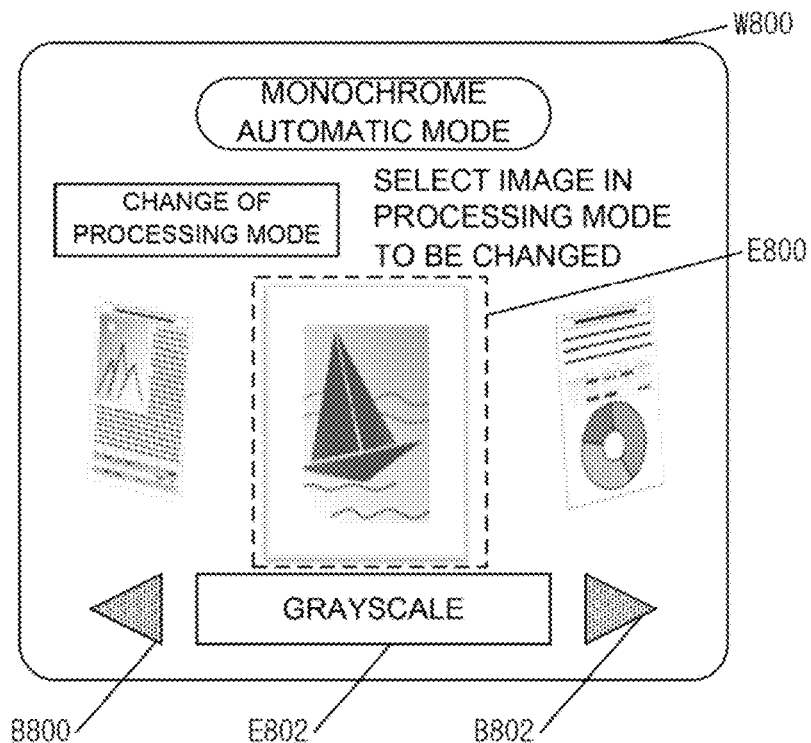
FIGS. 21A and 21B are diagrams illustrating an example of an operation according to an eighth embodiment.

For example, in the image forming apparatus 1 having a mode in which all scanned images can be buffered before the image data is output, such as a preview during scanning, the control section 60 displays a display screen W800 shown in FIG. 21A on the display section 54 before the image data is output. The display screen W800 shows a preview image E800 of the output data and a name E802 of the gradation reproduction method for each scanned image. The preview image E800 and the name of the gradation reproduction method E802 are switched when the button B800 and the button B802 are selected to perform switching to a preview image of a scanned image of one previous or one subsequent page, or when a gesture operation, such as a swipe, is performed.

Figure 21B:
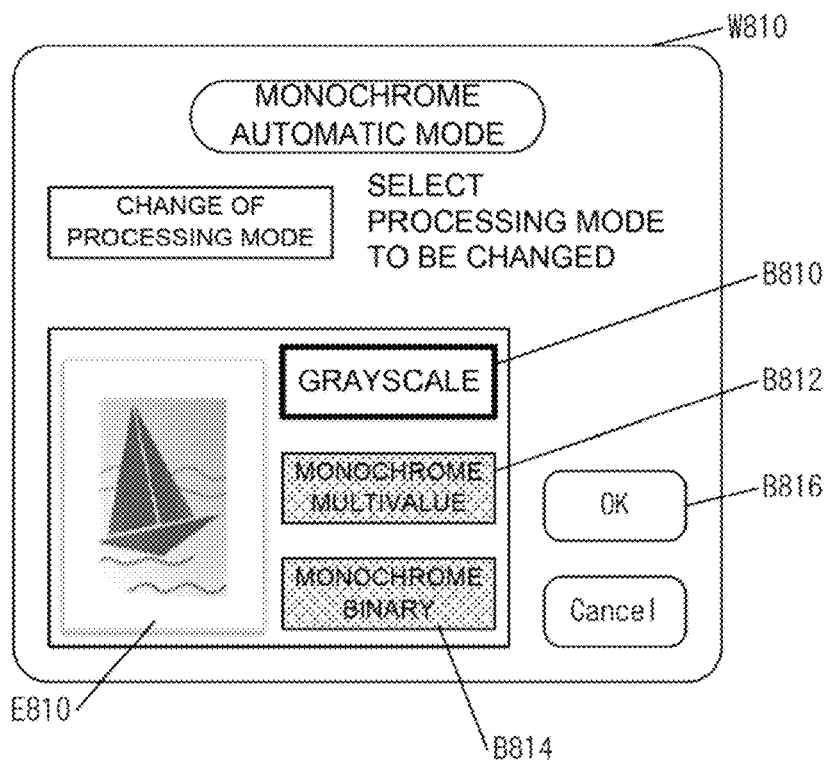

When the preview image E800 is selected by the user, the control section 60 displays on the display section 54 a display screen W810 for selecting a gradation reproduction method for the image data corresponding to the selected preview image. FIG. 21B is an example of the display screen W810.

The display screen W810 includes a preview image E810 of image data output by a currently selected gradation reproduction method and buttons B810, B812, and B814 for selecting a gradation reproduction method. Of the buttons B810, B812, and B814, the button corresponding to the currently selected gradation reproduction method (button B810 in FIG. 21B) is highlighted. When the user desires to change the gradation reproduction method, the user can select a button corresponding to the desired gradation reproduction method and select the OK button B816 to change the gradation reproduction method.

When the gradation reproduction method is determined for each image data to be output, the control section 60 outputs the image data in accordance with the selected gradation reproduction method.

According to this embodiment, the user may select the desired gradation reproduction method and output image data.

9. Modifications

The present disclosure is not limited to the above-described embodiments, and various modifications may be made. That is, implementations obtained by combining techniques appropriately changed without departing from the gist of the present disclosure are also included in the technical scope of the present disclosure.

In addition, while the above-described embodiments have portions separately described for convenience of explanation, it is needless to say that the embodiments may be combined and executed within a technically possible range.

In addition, the program that operates in each device in the embodiments is a program that controls a CPU or the like (a program that causes a computer to function) so as to implement the functions of the above-described embodiments. Moreover, the information handled by these devices is temporarily stored in a temporary storage device (for example, a RAM) at the time of processing, and then stored in various storage devices such as a ROM (Read Only Memory) and an HDD, and is read, corrected, and written by the CPU as needed.

Here, examples of a storage medium for storing the program may include a semiconductor medium (such as a ROM and a non-volatile memory card), an optical storage medium/magneto-optical storage medium (such as a Digital Versatile Disc (DVD), a Magneto Optical Disc (MO), a Mini Disc (MD), a Compact Disc (CD), and a Blu-ray Disc (BD) (registered trademark)), and a magnetic storage medium (such as magnetic tape and a flexible disk). In addition, the functions of the above-described embodiments are implemented by executing a loaded program. In some cases, the functions of the present disclosure are implemented by processing in collaboration with the operating system or another application program on the basis of the instructions of the program.

Furthermore, in the case of distribution to the market, the program can be stored and distributed in a portable recording medium, or transferred to a server computer connected via a network such as the Internet. In this case, a storage device of the server computer is also included in the present disclosure.

What is claimed is:

1. An image processing device comprising:
   an image reader that reads an image;
   a first determiner that determines whether character crushing occurs when the image is binarized;
   a second determiner that determines a rate of a photographic region in the image; and
   a controller that performs conversion into monochrome N-gradation image data based on determination results of the first and second determiners.

2. The image processing device according to claim 1, wherein the controller converts the image data into monochrome two-gradation image data when the first determiner determines that character crushing does not occur.

3. The image processing device according to claim 1, wherein the controller
   converts the image into monochrome N-gradation image data when the rate of the photographic region in the image is equal to or greater than a threshold value, and
   converts the image into monochrome M-gradation image data when the rate of the photographic region in the image is less than the threshold value, M being larger than 2 and smaller than N.

4. The image processing device according to claim 3, wherein the controller changes the threshold value by a user operation.

5. The image processing device according to claim 3, wherein the controller converts the image into monochrome N-gradation image data or monochrome M-gradation image data only when the first determiner determines that character crushing occurs.

6. The image processing device according to claim 3, wherein
   the N gradations represents each pixel with 8 bits when the image is quantized, and
   the M gradations represents each pixel with 2 to 7 bits when the image is quantized.

7. The image processing device according to claim 1, further comprising:
   a third determiner that determines whether a pseudo contour is to be generated when predetermined image processing is executed on the image, wherein
   as a result of the predetermined image processing performed on the image, the controller
   converts the image into monochrome N-gradation image data when the pseudo contour is generated, and converts the image into monochrome M-gradation image data when the pseudo contour is not generated, M being larger than 2 and smaller than N.

8. The image processing device according to claim 7, wherein the controller converts the image into monochrome N-gradation image data or monochrome M-gradation image data only when the first determiner determines that character crushing occurs.

9. The image processing device according to claim 7, wherein
- the N gradations represents each pixel with 8 bits when the image is quantized, and
- the M gradations represents each pixel with 2 to 7 bits when the image is quantized.

10. A control method comprising:
- reading an image;
- determining whether character crushing occurs when the image is binarized;
- determining a rate of a photographic region in the image; and
- performing conversion into monochrome N-gradation image data based on determination results of the determinations.

11. A non-transitory computer readable recording medium recording a program that causes a computer to execute:
- reading an image;
- determining whether character crushing occurs when the image is binarized;
- determining a rate of a photographic region in the image; and
- performing conversion into monochrome N-gradation image data based on determination results of the determinations.

* * * * *